United States Patent
Becker et al.

(10) Patent No.: US 6,373,483 B1
(45) Date of Patent: Apr. 16, 2002

(54) METHOD, SYSTEM AND COMPUTER PROGRAM PRODUCT FOR VISUALLY APPROXIMATING SCATTERED DATA USING COLOR TO REPRESENT VALUES OF A CATEGORICAL VARIABLE

(75) Inventors: Barry Glenn Becker, Mountain View, CA (US); Roger A. Crawfis, Dublin, OH (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/302,954

(22) Filed: Apr. 30, 1999

Related U.S. Application Data

(63) Continuation-in-part of application No. 08/987,242, filed on Dec. 9, 1997, which is a continuation-in-part of application No. 08/782,809, filed on Jan. 13, 1997, now Pat. No. 5,861,891.

(51) Int. Cl.⁷ .............................................. G06F 15/00
(52) U.S. Cl. ........................................................ 345/419
(58) Field of Search ................................. 345/418, 419, 345/420, 433, 427, 428, 440, 441, 442

(56) References Cited

U.S. PATENT DOCUMENTS

| | | | |
|---|---|---|---|
| 3,816,726 A | 6/1974 | Sutherland et al. | 345/524 |
| 4,719,571 A | 1/1988 | Rissanen et al. | 364/300 |
| 4,868,771 A | 9/1989 | Quick et al. | 364/578 |
| 4,928,247 A | 5/1990 | Doyle et al. | 395/160 |
| 4,994,989 A | 2/1991 | Usami et al. | 395/120 |
| 5,043,920 A | 8/1991 | Malm et al. | 395/119 |
| 5,072,395 A | 12/1991 | Bliss et al. | 364/443 |
| 5,150,457 A | 9/1992 | Behm et al. | 395/120 |
| 5,164,904 A | 11/1992 | Sumner | 364/436 |
| 5,201,047 A | 4/1993 | Maki et al. | 395/600 |

(List continued on next page.)

OTHER PUBLICATIONS

Almuallim, H. and Dietterich, T.G., "Learning Boolean Concepts in the Presence of Many Irrelevant Features," *Artificial Intelligence*, vol. 69, Nos. 1–2, pp. 279–305 (Sep. 1994).

(List continued on next page.)

*Primary Examiner*—Phu K. Nguyen
(74) *Attorney, Agent, or Firm*—Sterne, Kessler, Goldstein & Fox P.L.L.C.

"Angoss Software's KnowledgeSeeker(TM) Compatible With SAS Institute," http://www.newswire.ca/releases/September1997/18/c3915.html, pp. 1–2, Canada Newswire, Sep. 1997.

(57) ABSTRACT

A method, system, and computer program product for a new data visualization tool for determining distribution weights that represent values of a categorical variable and then mapping a distinct color to each of the weights so as to visually represent the different values of the categorical variable (or data attribute) in a scatter plot. The distinct colors of a splat are based on the distribution of categorical variable values in a corresponding bin, the distribution of which is represented by a vector. The vector contains as many locations as the number of different values for the categorical variable. The value stored in each location is typically a weight or percentage for that particular value of the categorical variable. Each location in the vector is also associated with a distinct color. The coloring of a single splat with multiple colors involves the rendering of each vector by looping through each vector location, and then based on the weight stored in that location, randomly selecting the same percentage of triangles in the splat for the color associated with that vector location. A threshold is used to help reduce confusion and decrease processing time by summing all weights below the threshold and assigning to it a single neutral color. A slider or other controller can be used to vary the value of the threshold.

28 Claims, 19 Drawing Sheets

(9 of 19 Drawing Sheet(s) Filed in Color)

U.S. PATENT DOCUMENTS

| | | | |
|---|---|---|---|
| 5,228,119 A | 7/1993 | Mihalisin et al. | 395/118 |
| 5,247,666 A | 9/1993 | Buckwold | 395/600 |
| 5,251,131 A | 10/1993 | Masand et al. | 364/419.08 |
| 5,253,333 A | 10/1993 | Abe | 395/62 |
| 5,282,262 A | 1/1994 | Kurashige | 395/126 |
| 5,295,243 A | 3/1994 | Robertson et al. | 395/160 |
| 5,303,388 A | 4/1994 | Kreitman et al. | 395/159 |
| 5,307,456 A | 4/1994 | MacKay | 395/154 |
| 5,325,445 A | 6/1994 | Herbert | 382/38 |
| 5,418,946 A | 5/1995 | Mori | 395/600 |
| 5,420,968 A | 5/1995 | Johri | 395/133 |
| 5,426,780 A | 6/1995 | Gerull et al. | 395/600 |
| 5,459,829 A | 10/1995 | Doi et al. | 395/152 |
| 5,463,773 A | 10/1995 | Sakakibara et al. | 395/600 |
| 5,515,486 A | 5/1996 | Amro et al. | 395/137 |
| 5,519,865 A | 5/1996 | Kondo et al. | 395/600 |
| 5,528,735 A | 6/1996 | Strasnick et al. | 395/127 |
| 5,546,529 A | 8/1996 | Bowers et al. | 395/159 |
| 5,553,163 A | 9/1996 | Nivelle | 382/227 |
| 5,555,354 A | 9/1996 | Strasnick et al. | 395/127 |
| 5,604,821 A | 2/1997 | Ranganathan et al. | 382/236 |
| 5,634,087 A | 5/1997 | Mammone et al. | 395/24 |
| 5,659,731 A | 8/1997 | Gustafson | 395/604 |
| 5,671,333 A | 9/1997 | Catlett et al. | 395/20 |
| 5,672,381 A | 9/1997 | Strasnick et al. | 395/355 |
| 5,675,711 A | 10/1997 | Kephart et al. | 395/22 |
| 5,675,785 A | 10/1997 | Hall et al. | 395/613 |
| 5,675,786 A | 10/1997 | McKee et al. | 395/614 |
| 5,678,015 A | 10/1997 | Goh | 395/355 |
| 5,680,476 A | 10/1997 | Schmidt et al. | 382/159 |
| 5,694,524 A | 12/1997 | Evans | 395/77 |
| 5,696,964 A | 12/1997 | Cox et al. | 395/605 |
| 5,706,495 A | 1/1998 | Chadha et al. | 395/602 |
| 5,724,573 A | 3/1998 | Agrawal et al. | 395/606 |
| 5,727,199 A | 3/1998 | Chen et al. | 395/606 |
| 5,732,230 A * | 3/1998 | Cullen et al. | 395/339 |
| 5,737,487 A | 4/1998 | Bellegarda et al. | 395/25.9 |
| 5,748,852 A | 5/1998 | Mahler | 395/61 |
| 5,787,274 A | 7/1998 | Agrawal et al. | 395/613 |
| 5,861,891 A | 1/1999 | Becker | 345/433 |
| 5,864,891 A * | 1/1999 | Becker | 345/433 |
| 5,877,775 A | 3/1999 | Theisen et al. | 345/440 |
| 5,930,803 A | 7/1999 | Becker et al. | 707/104 |
| 5,960,435 A | 9/1999 | Rathmann et al. | 707/101 |

OTHER PUBLICATIONS

"Angoss Software Announces Knowledge Studio Data Mining Solution," http://www.pathfinder.com/@@ xIEkOgYAVjbJZjKM/money/latest/press/PW/1997Oct27/92, Angoss Software Corporation, pp. 1–2, Oct. 1997.

Anthes, G.H., "GIS Eases Redistricting Worry", *Computerworld*, Oct. 7, 1991, p. 65.

"Atlas Software: A New Dimension in Data Management", advertisement, Atlas Software, Strategic Mapping, Inc., San Jose, CA 95117 (page and date unknown).

Becker et al., "Unsteady Flow Volumes," *Proceedings of Visualization '95*, pp. 329–335, 1995.

Becker et al., "Smooth Transitions between Bump Rendering Algorithms," *Computer Graphics Proceedings*, Annual Conference Series, 1993, pp. 183–190.

Benedikt, M., ed., *Cyberspace First Steps*, The MIT Press, Cambridge, Massachusetts (1992), pp. 1–436.

Beveaux, T., "Virtual Reality Gets Real", *New Media*, (Jan. 1993), pp. 32–35.

Blinn, James F., "Light Reflection Functions for Simulation of Clouds and Dusty Surfaces," *Computer Graphics*, vol. 16, No. 3, Jul. 1982, p. 116–124.

Boyl, J. et al., "Design of a 3D user interface to a database," submitted to Database Issues for Data Visualization Workshop, Jul., 1993, pp. 1–9.

Breiman et al., *Classification and Regression Trees*, Wadsworth International Group, entire book (1984).

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformations" *Computing Surveys*, vol. 10, No. 4, Dec. 1978, pp. 465–502.

Cestnik, B., "Estimating Probabilities: A Crucial Task in Machine Learning," *Proceedings of the 9th European Conference on Artificial Intelligence*, pp. 147–149 (Aug. 1990).

Clarkson, Mark A., "An Easier Interface", *BYTE*, Feb. 1991, pp. 277–282.

"Companies in Data Mining and Knowledge Discovery," http://kdnuggets.com/companies.html, pp. 1–4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book, 1991.

Crawfis et al., "Vector Field Visualization," *Computer Graphics and Applications*, vol. 14, pp. 50 –56, 1994.

Crawfis et al., "Texture Splats for 3D Scalar and Vector Field Visualization," *Proceedings of IEEE Visualization '93*, 1993, pp. 261–265.

Dasarathy, B.V., "Nearest Neighbor (NN) Norms: (NN) Patterns Classification Techniques," (IBL), *IEEE Computer Society Press*,pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Flanagan, William G., "Cyberspace Meets Wall Street", *Forbes*, Jun. 22, 1992, pp. 164–168.

Foley et al., "Computer Graphics: Principals and Practice", Second Edition, Addison–Wesley Publishing Co., 1990, pp. 731–734 and color plate III.23.

Forrest, D., "Seeing Data in New Ways", *Computerworld*, Jun. 29, 1992, pp. 85–86.

Friedman, J. H. et al., "Lazy Decision Trees," *Proceedings of the Thirteenth National Conference on Artificial Intelligence*, AAAI Press and the MIT Press, vol. 1, pp. 717–724 (1996).

Fuller, J.E., Using Autocad, 3d Ed., Chapter 17, *Viewing 3–D Drawings*, 1989, pp. 17–1—17–14, and Tutorial, pp. 19–15—19–16, Delmar Publishers, Inc., Albany, NY 12212.

Gershon, N. et al., "Visualization's New Tack: Making Sense of Information," IEEE Spectrum, Nov., 1995, pp. 38–47 and 55.

Good, I.J., *The Estimation of Probabilities: An Essay on Modern Bayesian Methods*, pp. xi–xii, MIT Press, pp. 1–79, (1965).

Graves, G.L., "NASA's Virtual Reality", *New Media*, (Jan. 1993), p. 36–38.

Graves, G.L., "Invasion of the Digital Puppets", *New Media*, (Jan. 1993), p. 38–40.

Greenwood, J., "Countdown to the Cybermarket," Financial Post Magazine, Mar., 1994, pp. 26–32.

Grinstein, G. et al., "Visualization for Knowledge Discovery", *Intl. J. Intelligent Systems 7*, 1992, pp. 637–648.

Hilderbrand, Carol, "GIS Vital In Utility's Duel with Competitor", *Computerworld*, Jan. 20, 1992, p. 43.

"IBM Digs Deep for Data Mining 'Gold'," http://www.software.ibm.com/data/intelli–mine/factsheet.html, pp. 1–8, IBM Corporation, Copyright 1997.

Inselberg et al., "Parallel Coordinates: A Tool for Visualizating Multidimensional Geometry," *Proceedings of Visualization '90*, pp. 361–378, 1990.

Jacobson, Bob, "The Ultimate User Interface", *BYTE*, Apr. 1992, pp. 175–182.

Johnson, Brian and Ben Shneiderman, "Tree–Maps: A Space–Filling Approach to the Visualization of Hierarchical Information Structures", *IEEE Visualization Proceedings '91*, Oct. 1991, pp. 284–291.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing*, Chapter 3, pp. 59–83, Academic Press, Inc., 1986.

Knuth, A., *The Art of Computer Programming*, Addison–Wesley, vol. 2, pp. 506–550 (1973).

Kohavi, R., "A Study of Cross–Validation and Bootstrap for Accuracy Estimation and Model Selection," *Proceedings of the 14th International Joint Conference on Artificial Intelligence*, Stanford University, 1995.

Kohavi, R. and Sommerfield, D., "Feature Subset Selection Using the Wrapper Model: Overfitting and Dynamic Search Space Topology," *Proceedings of the First International Conference on Knowledge Discovery and Data Mining*, pp. 192–197 (Aug. 1995).

Kohavi, R. and Li, C., "Oblivious Decision Trees, Graphs, and Top–Down Pruning," *Proceedings of the 14th International Joint Conference on Artificial Intelligence*, Chriss S. Mellish (Ed.), Morgan Kaufmann Publishers, Inc., pp. 1071–1077 (1995).

Kohavi, R., "Scaling Up the Accuracy of Naive–Bayes Classifiers: a Decision–Tree Hybrid," In *Data Mining and Visulaization*, Silicon Graphics, Inc., from The Second International Conference on Knowledge Discovery and Data Mining (1996).

Kohavi, R. and John, G., "Wrappers for Feature Subset Selection," http://robotics.stanford.edu/~{ronnyk,gjohn}, May 20, 1997.

Kohavi, R. et al., "Data Mining using MLC++: A Machine Learning Library in C++," *Tools With AI*, pp. 234–245 (1996).

Kononenko, I., "Inductive and Bayesian Learning in Medical Diagnosis," *Applied Artificial Intelligence*, vol. 7, pp. 317–337 (1993).

Langley, P. and Sage, S., "Oblivious Decision Trees and Abstract Cases," *Working Notes of the AAAI–94 Workshop on Case–Based Reasoning*, AAAI Press, pp. 113–117 (1994).

Langley, P., et al., "An Analysis of Bayesian Classifiers," *Proceedings of the Tenth National Conference on Artificial Intelligence*, pp. 223–228 (Jul. 1992).

Langley, P. and Sage, S., "Induction of Selective Bayesian Classifiers," *Proceedings of the Tenth Conference on Uncertainty in Artificial Intelligence*, Morgan Kaufmann Publishers, Inc., pp. 399–406 (Jul. 1994).

Laur et al., "Hierarchical Splatting: A Progressive Refinement Algorithm for Volume Rendering," *Computer Graphics*, vol. 25, No. 4, Jul. 1991, pp. 285–288.

Levoy, Marc, "Volume Rendering: Display of Surfaces from Volume Data," *IEEE Xomputer Graphics and Applications*, vol. 8, No. 5, May 1988, pp. 29–37.

Lincoff, G., *National Audubon Society Field Guide to North American Mushrooms*, New York, pp. 9–32, (1981).

Mangasarian, O. L. and Wolberg, W. H., "Cancer Diagnosis Via Linear Programming," *SIAM News*, vol. 23, No. 5, pp. 1&18 (Sep. 1990).

Martin et al., "High Dimensional Brushing for Interactive Exploration of Multivariate Data," *Proceedings of Visualization '95*, 1995, pp. 271–278.

Max et al., "Flow Volumes for Interactive Vector Field Visualization," *Proceedings of Visualization '93*, 1993, pp. 19–24.

Max et al., "Bump Shading for Volume Textures," *IEEE Computer Graphics and Applications*, Jul. 1994, 18–20.

Michie, et al., *Machine Learning, Neural and Statistical Classification*, Ellis Norwood United, entire book, (1994).

"MineSet 2.0 for Data Mining and Multidimensional Data Analysis," by C. Hall, http:// www.sgi.com/Products/software/MineSet/DMStrategies/, pp. 1–12, (1997). (originally appeared in Sep. 1997 issue of *Data Management Strategies*, Copyright 1997 Cutter Information Corp.).

"Mineset Awards," http://www.sgi.com/Products/software/MineSet/awards.html, p. 1, (Jan. 9, 1998).

MineSet User's Guide, Silicon Graphics Computer Systems, 1996, made available to public less than one year prior to Jan. 13, 1997.

Murthy, S. et al., "Randomized induction of oblique decision trees," *Proceedings of the Eleventh National Conference on Artificial Intelligence*, AAI Press/MIT Press, pp. 322–327 (1993).

Newquist, H.P., "Virtual Reality's Commercial Reality", *Computerworld 26 (3)*, pp. 93–95, 1996.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Information Builders, Dateline: Pacific Palisades, CA, "Remarkable 3D Main–Frame Graphics Available For PC Users", Feb. 1985.

News Release, Company: Structural Dynamics Res. Intl. Business Machines, Dateline: Boston MA, "Alias Sketch (TM) Resumes Shipping: Freeform 3D Illustration and Design Tool", Feb. 19, 1992.

News Release, Company: Information Builders, Inc., Dateline: Palm Desert, CA, "Information Builders Announces Release 3.0 of PC/Focus DBMS", Jun. 1, 1987.

News Release, Company: Alias Research, Dateline: Toronto, Ontario, "Alias Ships Sketch!, Freeform 3D Illustration and Design Program", Nov. 15, 1991.

News Release, Company: Virtus Corporation, Dateline: Cary, NC, "Virtus Walkthrough Releases Quicktime Component", Nov. 1, 1991.

News Release, Company: Honeywell Bull, Dateline: Bilerica, MA "Relational Software System Increases Integration, Productivity for Honeywell Bull Users", Jul. 17, 1987.

"News: What's New—Business Software", *BYTE*, Mar. 1992, p. 78.

"Other Web Sites for Data Mining and Knowledge Discovery," http://kdnuggets.com/websites.html, pp. 1–3, Last updated: Sep. 10, 1997.

Pollack, A., "The 2–D Screen Gives 3–D World" New York Times (date unknown).

*Precision Visuals International Limited*, "Summary of PV–WAVE Point & Click Visual Data Analysis Software", 1991.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1,pp. 81–106 (1986).

Radding, Alan, "PC GIS: Expect Gain But Also Some Pain", *Computerworld*, Feb. 17, 1992, p. 89.

Rendell, L. and Seshu, R., "Learning hard concepts through constructive induction: framework and rationale," *Computational Intelligence*, vol. 6, No. 4, pp. 247–270 (Nov. 1990).

Sabella, Paolo, "A Rendering Algorithm for VIsualizing 3D Scalar Fields," *Computer Graphics*, vol. 22, No. 4, Aug. 1988, pp. 51–58.

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

"Silicon Graphics MineSet Wins Bronze Miner Award," http://www.sgi.com/Headlines/1997/October/mineset_release.html, pp. 1–2, (Oct. 1, 1997).

Stein et al., "Sorting and Hardware Assisted Rendering for Volume Visualization," *IEEE*, 1995, pp. 83–89.

Structural Dynamics Research Corporation News Release, "SDRC Announces Software Translator Between CADAM and I–DEAS", Mar. 31, 1992.

"The 1997 Database Dozen," by D. Stodder, http://www.db-pd.com/96dozen.htm, pp. 1–2, (1996 or 1997).

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Van Wijk et al., "HyperSlice," *Proceedings of Visualization '93*, 1993, pp. 119–125.

Weiss, S.M. and Kulikowski, C.A., *Computer Systems That Learn: Classification and Prediction Methods from Statistics, Neural Nets, Machine Learning, and Expert Systems*, Morgan Kaufmann Publishers, Inc., entire book, (1991).

Westover, Lee, "Footprint Evaluation for Volume Rendering," *Computer Graphics*, vol. 24, No. 4, Aug. 1990, pp. 367–376.

Wilder, C., "Virtual Reality Seeks Practicality", *Computerworld 26 (17)*, Apr. 27, 1992, p. 26.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Yavelow, C., "3–D Sound Found In Space", *New Media*, (Jan. 1993), pp. 40–41.

Amsbury, W., *Data Structures from Arrays to Priority Queues*, Wadsworth Publishing, Belmont, CA, pp. viii and 331–336, Copyright 1985.

Date et al., *A Guide to SQL/DS*, Addison–Wesley Publishing, New York, NY, pp. xiii and 97–118, Copyright 1989.

Hecht–Nielsen, R., *Neurocomputing*, Addison–Wesley Publishing, pp. ix–xiii and 175–201, Copyright 1990.

Hsiao et al., "Supervised Textured Image Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.

Robert et al., "Continuously Evolving Classification of Signals Corrupted by an Abrupt Change", *IEEE–IMS Workshop on information theory and statistics*, p. 97, Oct. 1994.

Santos–Victor et al., "A Computer Vision System for the Characterization and Classification of Flames in Glass Furnaces", *IEEE Transactions on Industry Applications*, vol. 29, No. 3, pp. 470–478, Jun. 1993.

Taxt et al., "Segmentation of Document Images", *IEEE Transactions on Pattern Analysis and Machine Intelligence*, vol. 11, No. 12, pp. 1322–1329, Dec. 1989.

Venables, W.M. and Ripley, B.D., *Modern Applied Statistics with S–PLUS*, Springer–Verlag, 1994, pp. 413–425.

Mihalisin, T. et al., "A Robust Visual Access and Analysis System for Very Large Multivariate Databases," *Computing Science and Statistics, vol. 26, Computationally Intensive Statistical Models, Proceedings of the 26th Symposium on the Interface*, Jun. 15–18, 1994, pp. 426–430.

\* cited by examiner

GAUSSIAN TEXTURE — 700

| 5 | 13 | 8 | 3 | 2 | 5 | 3 | 1 | 5 | 4 | 21 | 3 | 1 | 2 | 4 | 5 | 5 | 1 | 5 | 2 | 2 |
|---|----|---|---|---|---|---|---|---|---|----|---|---|---|---|---|---|---|---|---|---|
| a | b  | c | d | e | f | g | h | i | j | k  | l | m | n | o | p | q | r | s | t | u |

| 13 | 8 | 21 | 58 |
|----|---|----|-----|
| b  | c | k  | other |

| a | b | c | d | e | f | g | h | i | j | k | l | m | n | o | p | q | r | s | t | u |
|---|---|---|---|---|---|---|---|---|---|---|---|---|---|---|---|---|---|---|---|---|
| 5 | 13 | 8 | 3 | 2 | 5 | 3 | 1 | 5 | 4 | 21 | 3 | 1 | 2 | 4 | 5 | 5 | 1 | 5 | 2 | 2 |

1920:

| a | b | c | d | e | f | g | h | i | j | k | l | m | n | o | p | q | r | s | t | u |
|---|---|---|---|---|---|---|---|---|---|---|---|---|---|---|---|---|---|---|---|---|
| 1 | 9 | 1 | 3 | 2 | 4 | 1 | 2 | 2 | 7 | 11 | 9 | 4 | 13 | 1 | 1 | 2 | 21 | 4 | 1 | 1 |

1930:

| b | c | k | other |
|---|---|---|---|
| 13 | 8 | 21 | 58 |

1940:

| b | j | k | l | n | r | other |
|---|---|---|---|---|---|---|
| 9 | 7 | 11 | 9 | 13 | 21 | 30 |

FIG. 20

| 2010 | b | c | j | k | l | n | r | other |
|---|---|---|---|---|---|---|---|---|
| | 13 | 8 | 0 | 21 | 0 | 0 | 0 | 58 |

| 2020 | b | c | j | k | l | n | r | other |
|---|---|---|---|---|---|---|---|---|
| | 9 | 0 | 7 | 11 | 9 | 13 | 21 | 30 |

| 2030 | b | c | j | k | l | n | r | other |
|---|---|---|---|---|---|---|---|---|
| | 13 | 8 | 0 | 21 | 0 | 0 | 0 | 58 |

| 2040 | b | c | j | k | l | n | r | other |
|---|---|---|---|---|---|---|---|---|
| | 4.5 | 0 | 3.5 | 5.5 | 4.5 | 6.5 | 10.5 | 15 |

| 2050 | b | c | j | k | l | n | r | other |
|---|---|---|---|---|---|---|---|---|
| | 11.7 | 5.3 | 2.3 | 17.6 | 3 | 4.3 | 7 | 48.7 |

METHOD, SYSTEM AND COMPUTER PROGRAM PRODUCT FOR VISUALLY APPROXIMATING SCATTERED DATA USING COLOR TO REPRESENT VALUES OF A CATEGORICAL VARIABLE

CROSS-REFERENCE TO RELATED APPLICATIONS

This is a continuation-in-part application of the application entitled "Interpolation Between Relational Tables For Purposes Of Animating A Data Visualization," U.S. application Ser. No. 08/987,242, filed Dec. 9,1997, which is a continuation-in-part application of the application entitled "Method, System, and Computer Program Product for Visually Approximating Scattered Data", U.S. application Ser. No. 08/782,809, filed on Jan. 13, 1997, now U.S. Pat. No. 5,861,891.

This patent application is also related to the application entitled "Computer-Related Method, System, and Program Product for Controlling Data Visualization in External Dimensions", U.S. application Ser. No. 08/748,548, by G. Sang'udi, et al, filed on Nov. 12, 1996 (incorporated by reference in its entirety herein).

BACKGROUND OF THE INVENTION

1. Field of the Invention

The present invention relates to visualizing scattered data points using a computer display.

2. Related Art

Computer visualization tools are called upon to handle ever increasing amounts of data. Conventional scatter plots visually represent multivariate data points as graphical glyphs plotted along one, two, or three axes. Each data point has one or more data attributes, also called variables. These data attributes can be numerical or categorical. Each axis can represent a different data attribute. Additional data attributes can be represented by varying the color or size of the glyphs.

Problems are encountered in visualizing scattered data when the number of data points is large. In general, each data point in a conventional scatter plot is represented by a corresponding glyph. As the number of scattered data points increases, more glyphs crowd a scatter plot display. The time it takes to render each glyph increases. The time it takes to build and display a scatter plot can become too long, thereby, precluding interactive, on-the-fly rendering of scattered data. Occlusion can also occur as data points in the foreground of a scatter plot hide data points behind them. A serious problem occurs when many data points occupy the same location.

To illustrate the above problem, consider a two-dimensional scatter plot containing millions of data points. It takes a very long time for a graphics processor to draw millions of glyphs covering all these data points. If each data point is represented by a single pixel on the screen, then there will be many overlapping data points. Only the data point for a glyph which is drawn last for a given pixel location will be seen.

T he same problems occur in three-dimensional scatter plots where three-dimensional (3-D) glyphs (e.g., cubes, spheres. etc.) are used to represent data points. These 3-D glyphs are plotted with respect to three scatter plot axes. Rendering such a 3-D scatter plot for large numbers of data points can take a long time, as many glyphs must be processed. Moreover, if there are many data points to be covered, glyphs in the foreground occlude those in the back. Also, data is hidden when the data points are clustered together. There is no easy way to examine data inside a cluster.

What is needed is a data visualization tool that visually approximates a scatter plot when a large number of data points needs to be drawn. Further, what is needed is a visualization tool that handles the case where a categorical variable has been mapped to the color of the scattered data points. To accomplish this using the splatting technique described herein, it is necessary to first determine distribution weights that represent values of a categorical variable in each bin, and then map a distinct color to each of the weights corresponding to the different values of the categorical variable in the scatter plot.

SUMMARY OF THE INVENTION

The present invention provides a method, system, and computer program product for a new data visualization tool for representing distribution weights that represent values of a categorical variable and then mapping a distinct color to each of the weights so as to visually represent the different values of the categorical variable (or data attribute) in a scatter plot. A special type of splat is used to represent the distribution of colored data points in a bin. In an alternate embodiment, distribution weights mapped to distinct colors are used to represent values for a numerical variable. Through a binning process, bins of scattered data points are formed. Each axis of a scatter plot is discretized according to a binning resolution. Bin positions along each discretized scatter plot axis are determined from bin numbers.

According to one embodiment of the present invention, the bins, which represent a cloud of scattered data points, are volume rendered as splats. The opacity of each splat is a function of the number (count or weight) of data points in a corresponding bin. The distinct colors of the splat are based on the distribution of categorical variable values in a corresponding bin. The variable which is mapped to splat colors is typically a variable other than one mapped to a scatter plot axis.

In one example of the present invention, the mapping of a categorical variable to color involves storing a vector of weights (counts) for each bin. (Bins are represented as rows in a table which are computed by aggregating an original data set). The vector is used to represent the distribution of the categorical variable values in the bin. The vector contains as many locations as the number of different values for the categorical variable. The value stored in each vector location is typically the percentage of the total weight of data in the bin for that particular value of the categorical variable. Each location in the vector is also associated with a distinct color. The splat used to represent a bin graphically needs to show the distribution of categorical variable values. The present invention describe a method in which this can be accomplished. The method involves a random set of opaque triangles, where a percentage of the triangles are of each color, and the total number of triangles map to bin weight. The coloring of a single splat with multiple colors involves the rendering of each vector by looping through each vector location, and then based on the weight stored in that location, randomly selecting the same percentage (or weight) of triangles in the splat for the color associated with that vector location.

According to a further feature of the present invention, a threshold is used to help reduce confusion and decrease processing time by summing all weights below the threshold and assigning to it a single neutral color. A slider or other controller can be used to vary the value of the threshold.

According to another embodiment of the present invention, interpolated data is used for animating an external query attribute of a scatter plot of data points in a computer system. An external query device (or slider) corresponding to an attribute of the data points is used to animate over that data attribute. If the slider control is positioned in between discrete positions of the slider, the displayed plot corresponds to interpolated data. First adjacent data structures (or data tables) are determined corresponding to the position of the external query means. The adjacent data structures are merged together, then aggregated the using the spatial columns of the data structure as a unique key. For a categorical variable, weights (or percentages) of the same value in vectors to be merged get aggregated together. An interpolated bin is generated, where the count (or weight) of the bin is interpolated and the weights in the vector is also interpolated, but weighted by the new count. The interpolated vector is mapped to color in the visualized scatter plot. The plot appears as rendered splats corresponding to bin positions of the interpolated bins, where each splat has an opacity that is a function of the interpolated count of data points in the corresponding bin. The present invention allows for the smooth animation of one or more external query attributes of the data points.

Further features and advantages of the present invention, as well as the structure and operation of various embodiments of the present invention, are described in detail below with reference to the accompanying drawings.

BRIEF DESCRIPTION OF THE DRAWINGS

The file of this patent application contains at least one drawing executed in color. Copies of this patent with color drawing(s) will be provided by the Patent and Trademark Office upon request and payment of the necessary fee.

The accompanying drawings, which are incorporated herein and form part of the specification, illustrate the present invention and, together with the description, further serve to explain the principles of the invention and to enable a person skilled in the pertinent art to make and use the invention.

FIG. 16A shows a vector representing the distribution of a categorical variable that has 21 different values.

FIG. 16B shows a vector representing the same categorical variable as FIG. 16A with the 3 most prevalent values in the first three positions, and the remaining value "other."

FIG. 19 shows vectors used in the illustration of the interpolation of data relating to the values of a categorical variable.

FIG. 20 shows vectors used in the illustration of the interpolation of data relating to the values of a categorical variable.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Terminology

Figure 1:
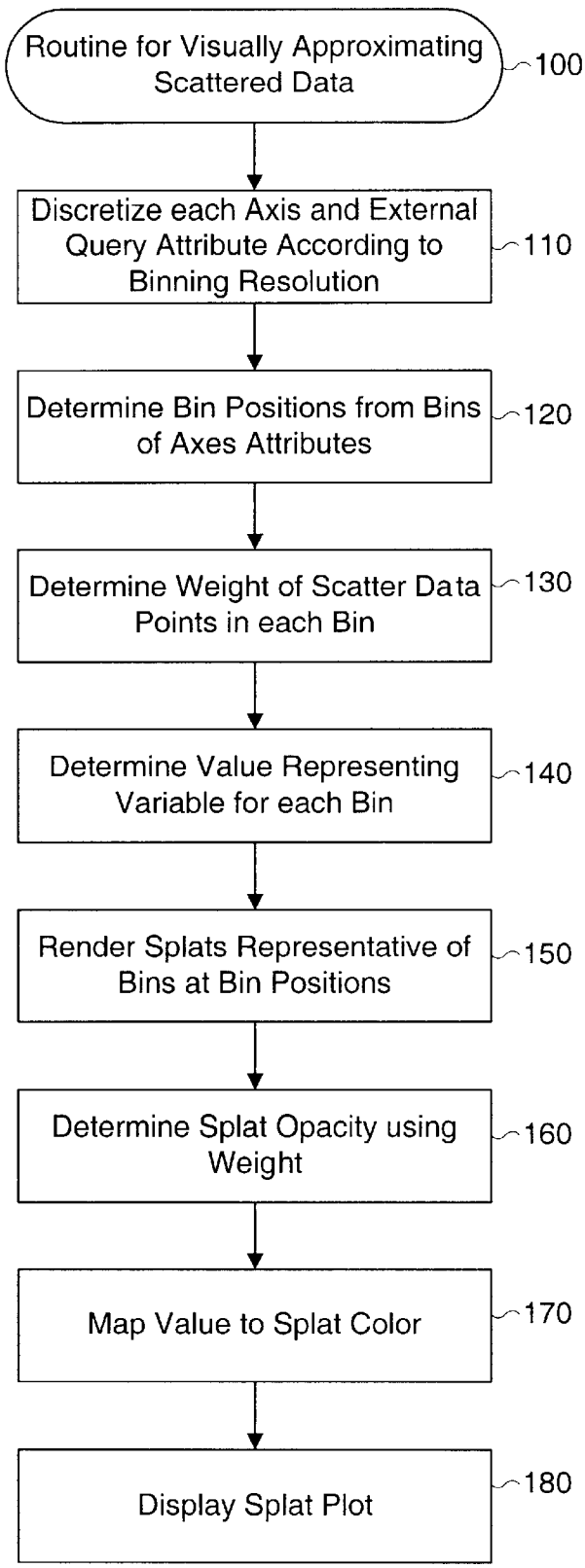
FIG. 1 is a flowchart showing a routine for visually approximating scattered data according to the present invention.

The present invention provides a new data visualization tool that visually approximates a scatter plot, provides smooth animation of graphics by using interpolated data and adequately represents a categorical data attribute that is represented by varying colors of the scatter plot. Bins, representing clouds of scattered data points, are volume rendered as splats. The opacity of each splat is a function of the density of data points (e.g. the count or number of data points) in a corresponding bin. The color of the splat represents a data attribute associated with the data points in a corresponding bin.

The following terms are used to describe the present invention:

"Data," "data points," "scattered data," "multivariate data.," and equivalents thereof, are used interchangeably to refer to a data set having corresponding data attributes (also called variables) that are suitable for a multivariate data visualization, such as, a scatter plot. One data point can contain multiple data attributes. Data attributes are represented as numerical or categorical variables in each axis of a scatter plot. Numerical variables can include any type of numerical value or range (e.g. real numbers or integers).

Categorical variables have nominal values like text strings. For example, a data attribute representing color can include the following categorical variable values: "red," "blue." and "orange." Numerical values can also be assigned to each categorical variable value for sorting and other operations (i.e. "red" can be set to 1, "blue" can be set to 2, and "orange" can be set to 3).

A 1-D scatter plot has one axis plotting one variable. A 2-D scatter plot has two axes plotting two variables. A 3-D scatter plot has three axes plotting three variables. Any type of data can be used, including but not limited to, business, engineering, science, and other applications. Data sets can be received as data records, flat files, relational or non-relational database files, direct user inputs, or any other data form, "Binning" refers to any conventional process for aggregating scattered data points into bins. Bins can be made up of uniform and/or non-uniform clusters of data points. "Splat" (also called a footprint) refers to any transparent shape used to build a transparent volume. For example, splats, when composited in a back to front order relative to an eye point (or a front to back order), can be used to reconstruct transparent volumes.

Splats used in the present invention can include, but are not limited to, Gaussian splats. A Gaussian splat is one that is most opaque at its center and approaches zero opacity, according to a Gaussian function in every radial direction. A Gaussian splat is typically approximated with a collection Gouraud shaded triangles, or more accurately, as a texture mapped polygon (e.g. rectangle).

Splats used in the present invention can also include, but are not limited to, the examples of splats described in the following articles (each of which is incorporated by reference herein): L. Westover, "Footprint Evaluation for Volume Rendering", Proceedings of SIGGRAPH '90, Vol 24 No 4, pp 367–376; Lauer and Hanrahan, "Hierarchial Splatting: A Progressive Refinement Algorithm for Volume Rendering," Computer Graphics, vol.25, No.4, July 1991, pp.285–289; and Crawfis and Max, "Texture Splats for 3D Scalar and Vector Field Visualization", Proceedings of Visualization 1993, p 261–265. For instance, a splat can be drawn as a collection of Gouraud shaded triangles (see, e.g. the Lauer and Hanrahan 1991 article), or as texture mapped rectangles (see, e.g., the Crawfis and Max 1993 article).

Figure 7B:
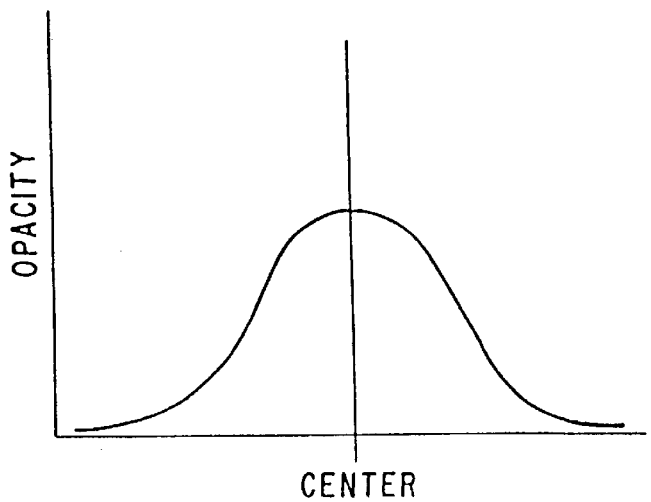
FIG. 7B is a graph of the opacity of the Gaussian texture in FIG. 7A.
Figure 7A:
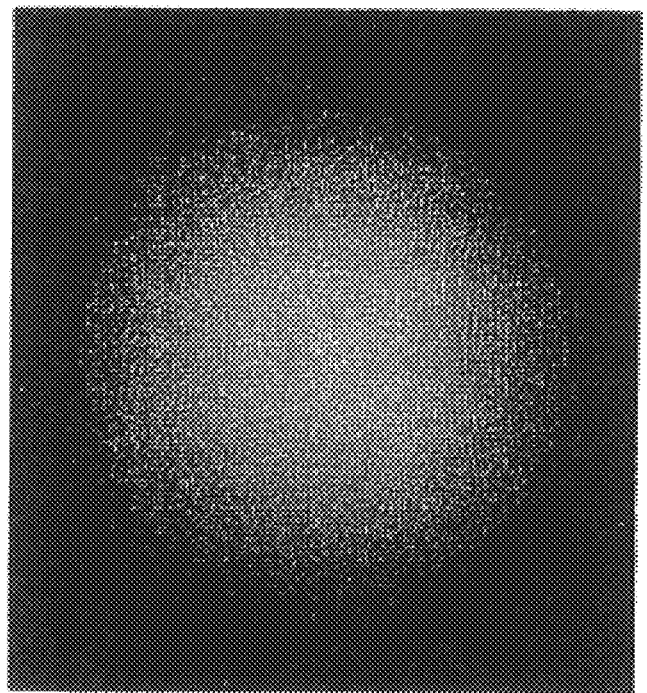
FIG. 7A is an image of an example Gaussian texture that can be texture mapped by a graphics engine to form a textured splat according to the present invention.

FIG. 7A shows an example of a Gaussian texture 700 that can be texture mapped by a graphics engine to form a textured splat. FIG. 7B is a graph of the opacity of Gaussian texture 700 illustrating the variation in opacity from a peak at the center to zero according to a Gaussian function.

An external query device or "slider" is used to vary the display of data in an external dimension. A slider is often a button or dial which a user moves along a scale to set the data visualization to a different value or range of values in the external dimension. A complete description of external query sliders is provided in the related '548 application, by G. Sang'udi, et al. (incorporated by reference above).

2. Example Environment

The present invention is described in terms of an example computer graphics and data mining environment. Given the description herein, it would be obvious to one skilled in the art to implement the present invention in any general computer including, but not limited to, a computer graphics processor (single chip or multiple chips), high-end to low-end graphics workstations, virtual machine (e.g. Java-created application), and network architectures (e.g., client/server, local, intermediate or wide area networks). In one preferred example, the present invention can be implemented as software, firmware, and/or hardware in a data mining tool, such as, the Mineset product released by Silicon Graphics, Inc., and executed on a graphics workstation manufactured by Silicon Graphics, Inc. (e.g. an Indigo$^2$, Indy, Onyx, or $O_2$ workstation). A further example computer system is described below with respect to FIG. 5, but is not intended to limit the present invention.

Description in these terms is provided for convenience only. It is not intended that the invention be limited to application in this example environment. In fact, after reading the following description, it will become apparent to a person skilled in the relevant art how to implement the invention in alternative environments.

3. Visually Approximating Scattered Data

FIG. 1 shows a routine 100 for visually approximating scattered data according to the present invention. For clarity, the steps of routine 100 will be described in general terms and with reference to a specific example. The specific example uses a sample ore data set of data records related to ore samples extracted from a mining site, as shown in the table below:

TABLE 1

Sample Ore Data Set

| Longitude (x) | Latitude (y) | Depth (z) | Value (color) |
|---|---|---|---|
| 6586.435 | 21866.457 | 9849.911 | 0.01 |
| 6585.729 | 21866.958 | 9850.411 | 0.01 |
| 6585.023 | 21867.459 | 9850.911 | 0.01 |
| 6584.317 | 21867.961 | 9851.411 | 0.02 |
| . | | | |
| . | | | |
| . | | | |
| 6568.526 | 22281.813 | 10028.994 | 2.35 |
| 6628.461 | 22281.813 | 10090.753 | 0.14 |
| 6650.017 | 22281.834 | 10094.368 | 0.02 |
| 6631.844 | 22281.848 | 10152.818 | 0.03 |
| 6599.928 | 22281.867 | 10067.001 | 0.05 |
| (8191 rows) | | | |

Each data record has four attributes (longitude, latitude, depth, and value) characterizing each ore sample. The first three attributes represent the x,y,z location (longitude, latitude, depth) of an ore sample within the mining site. The fourth attribute (value) gives an indication of the quality of the ore in the sample taken at that location. These four attributes are illustrative. Each data record can have many additional attributes.

A. Binning

In step 110, each scatter axis variable is discretized according to a binning resolution to form bins. In general, any conventional binning technique (uniform or non-uniform) can be used to bin numeric (i.e. real-valued) attributes and categorical attributes. If a categorical attribute is mapped to an axis then the binning is defined to be the distinct values of that attribute. or some grouping of these values based on metadata.

Preferably, uniform bins are created for each variable (or data attribute) that is mapped to a scatter axis. Non-uniform bins can also be formed. In one simple example, each axis of a scatter plot can be discretized into k bins, where k is a positive integer. In a 2-D case, $k_1*k_2$ bins (or "buckets") are available for aggregating data points on two respective discretized axes. In a 3-D case, $k_1*k_2*k_3$ bins are available for aggregating data points on three respective discretized axes. Binning is performed as part of pre-processing to reduce processing during rendering.

Bin positions are then determined from the bins (step 120). Bin positions define the order of bins along each discretized axis and can be determined from bin numbers associated with the bins. For a numeric attribute, the bin numbers are determined from the discretized real-values, that is, sorting the bins based on the discretized real-values and determining corresponding bin positions. For a categorical attribute, the bin numbers are determined from the distinct values of that attribute. The order of bins (and corresponding bin positions) along a discretized axis can be determined by sorting the distinct categorical values in any number of different ways. For example, sorting methods can include. but are not limited to, sorting based on alphabetical or numeric order, sorting based on count, or sorting based on an aggregate value (e.g. average) of the attribute mapped to color.

A count of the number of scattered data points aggregated into each bin is determined (step 130). An aggregate value that represents a data attribute of the scattered data points in a bin is determined for each bin as well (step 140). The aggregate value in one preferred example is an average value of a data attribute of scatter data points in a bin. The aggregate value can also be a minimum, maximum, median, count, or any other value representing a data attribute of scatter data points in a bin. The aggregate value can represent an external variable not mapped to an axis or a data variable that is mapped to an axis. There could be multiple value columns in Tables 1 and/or 2, each value column representing a different data attribute. In the splat plot visualization as described below, it is a simple matter to select among the value columns for purposes of mapping the color without doing any additional computation.

A data structure can be created to store bin position, count, and value data for each bin as determined in steps 120 to 140 , respectively. For example, a new table having records corresponding to bins and data attributes representative of the bins (e.g. bin position, count. and value of an external attribute) can be created. An example new binned table drawn from the sample ore data set of Table 1 for three-dimensions (longitude, latitude, and depth) is shown below:

TABLE 2

Binned Sample Ore Data Set

| Longitude-Bin | Latitude-Bin | Depth-Bin | Value | Count |
|---|---|---|---|---|
| 0 | 15 | 17 | 0.02 | 6 |
| 0 | 21 | 12 | 0.02 | 3 |
| 1 | 20 | 0 | 0.02 | 1 |
| 1 | 21 | 12 | 0.0225 | 4 |
| 2 | 14 | 17 | 0.0266 | 3 |
| 2 | 15 | 17 | 0.01 | 1 |
| 2 | 20 | 0 | 0.027 | 7 |
| . | . | . | . | . |
| . | . | . | . | . |
| . | . | . | . | . |
| 42 | 49 | 37 | 0.03 | 3 |
| 43 | 48 | 36 | 0.04 | 1 |
| 49 | 49 | 36 | 0.01 | 1 |
| (1743 rows) | | | | |

The binning resolution here is arbitrarily chosen to be k=50 making rendering about ten times faster than a scatter plot using all of the data points. A two-dimension example would only need two bin position data attributes (e.g., any two of longitude, latitude, or depth). One-dimension example would only need one bin position data attribute (e.g., longitude, latitude, or depth).

B. Rendering Splats

Next, in step 150, splats representative of the bins are rendered in a graphics engine. A splat is drawn at each bin location to form an image that visually approximates an original scatter plot of the data. Splats are rendered in a back-to-front order (or front-to-back order) during compositing such that splats located furthest from a display screen are rendered before splats located closer to a display screen.

For each bin, the count of scattered data points aggregated in the bin is mapped to a splat opacity (step 160). In one example, a graphics engine texture maps the opacity value across a polygon to represent a splat.

In one preferred embodiment, the splat opacity is a function of the count of aggregated data points in a corresponding bin as determined by the following equation:

$$\text{opacity} = 1 - \exp(-u * \text{count}),$$

where, opacity represents the opacity value of a splat at its center, count represents the count of aggregated data points in a corresponding bin, u represents a global scale factor, and exp denotes an exponential function (such as, an exponential function having a natural logarithm base e). The above exponential opacity function is effective in modeling light propagation through clouds of light emitting spheres.

A slider or other controller can be used to vary the value of the global scale factor u. This allows globally scaling of the opacity for each splat to make an entire display image of rendered splats more or less transparent. This scaling by the global scale factor, while impacting the entire image, is not linear. A splat's opacity is scaled differently depending upon its count, that is. the number of data points the splat represents.

Figure 6:
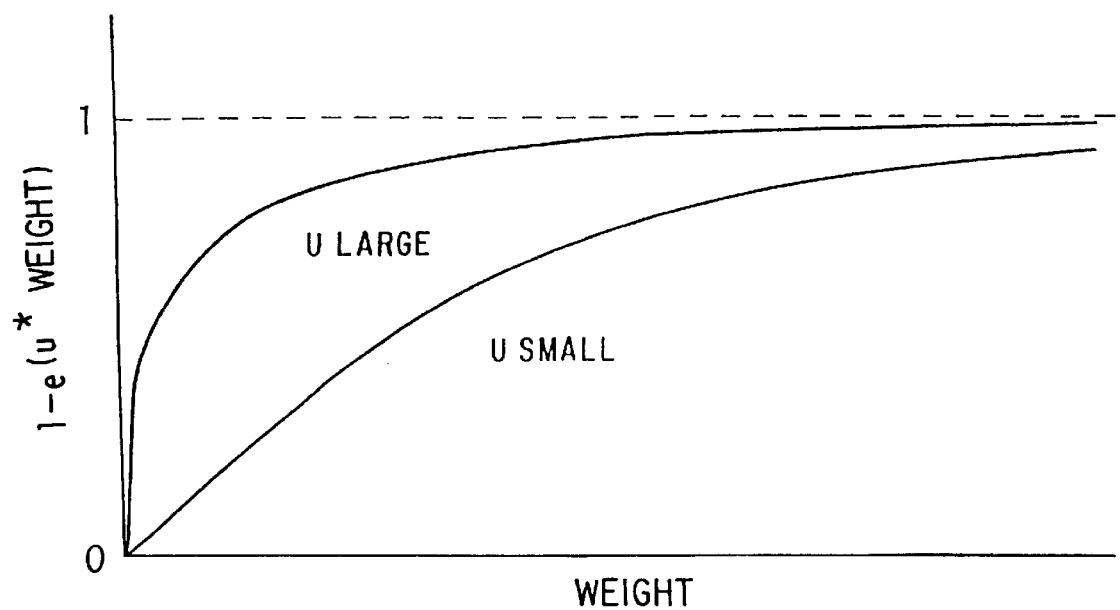
FIG. 6 is a graph showing an opacity function used in the present invention for large and small global scale factors.

FIG. 6 is a graph showing the above opacity function using large and small global scale factors. In particular, the opacity value for a splat is an exponential function of the count of the scattered data points that approaches an asymptotic limit 1 for large counts. The global scale factor is set to a value (i.e. large or small) for a particular image. As shown in FIG. 6, when a large global scale factor is used, each splat's opacity approaches the asymptotic limit 1 more quickly (for lower counts) than a small global scale factor.

In step 170, the value representative of a variable associated with the aggregated data points in a respective bin determined in step 140, is mapped to a color value. For example, a color transfer function can be used to map an average value of a numeric external variable for each bin. Each splat is then rendered with a color value that is a function of the external variable associated with the aggregated data points in a respective bin.

Finally, the splats are composited to form a volume rendered image on a display screen (step 180). The image includes the rendered splats with opacity and color determined according to steps 150–170. The splats are plotted along discretized scatter axes at bin positions determined in step 120. In this way, the volume rendered image is a splat plot that visually approximates the scattered data points.

Figure 2:
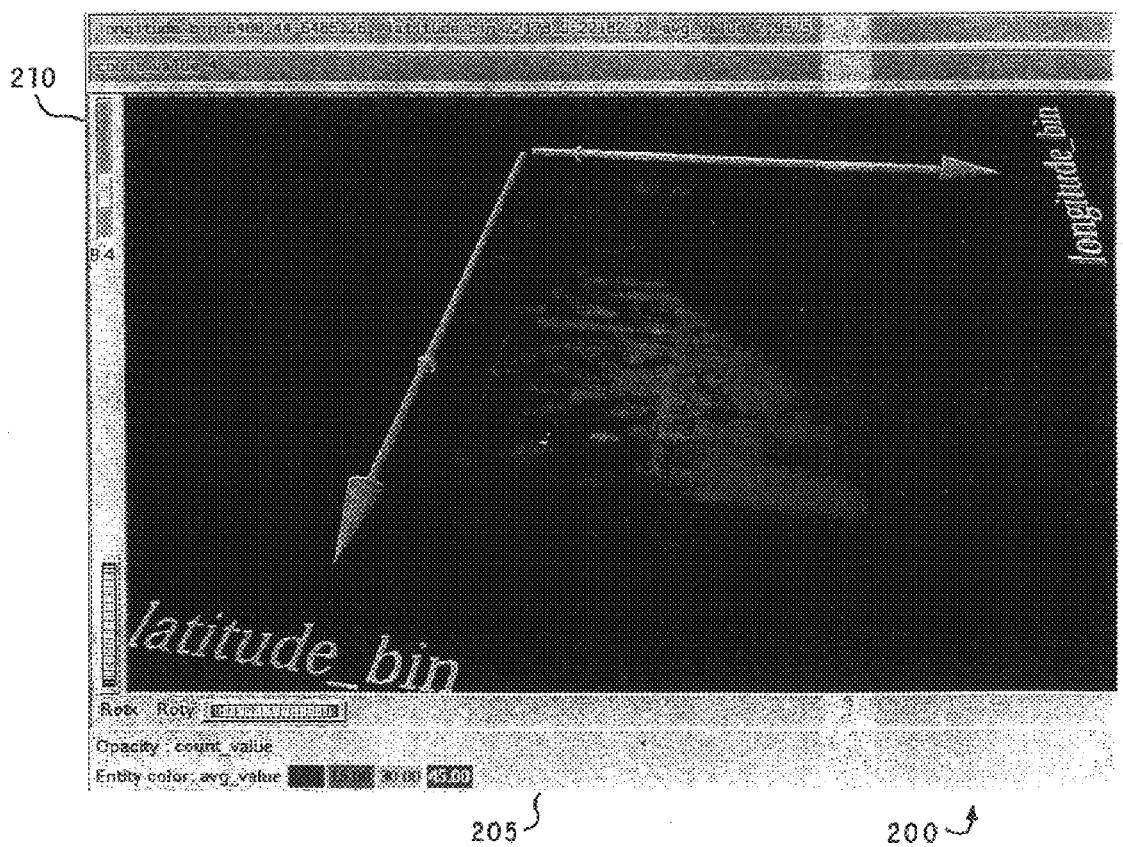
FIG. 2 is an example color image of a two-dimensional splat plot that uses splats to visually approximate scattered data according to the present invention.

FIG. 2 shows an example color image of a two-dimensional splat plot 200 that uses splats to visually approximate scattered data according to the present invention. Splat plot 200 was generated using the sample data described above with respect to Tables 1 and 2.

A display window 205 includes a slider 210 and two thumb wheels Rotx, Roty for manipulating the orientation of the two-dimensional splat scatter plot 200. Slider 210 globally alters the opacity of splats in the two-dimensional splat scatter plot 200. Thumbwheels Rotx and Roty rotate the image about horizontal and vertical axes respectively. Other controls (not shown) for manipulating the plot 200 such as, magnifying, reducing, or shifting the image can be used. Finally, a legend is provided to show what the opacity and color of the splats represent (e.g. opacity represents a count value and color represents an average value, 0–15 is mapped to blue, 15–30 is mapped to green, 30–45 is mapped to yellow, and 45 and above is mapped to red).

Figure 3:
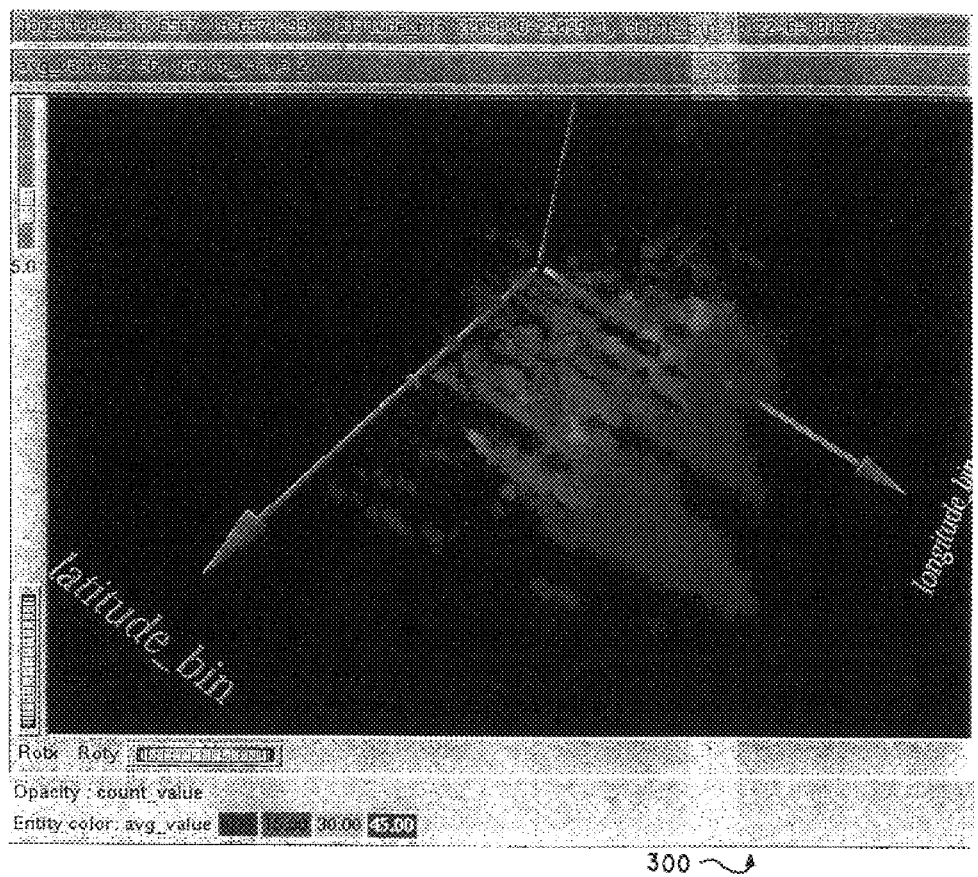
FIG. 3 is an example color image of a three-dimensional splat plot that uses splats to visually approximate scattered data according to the present invention.
Figure 4:
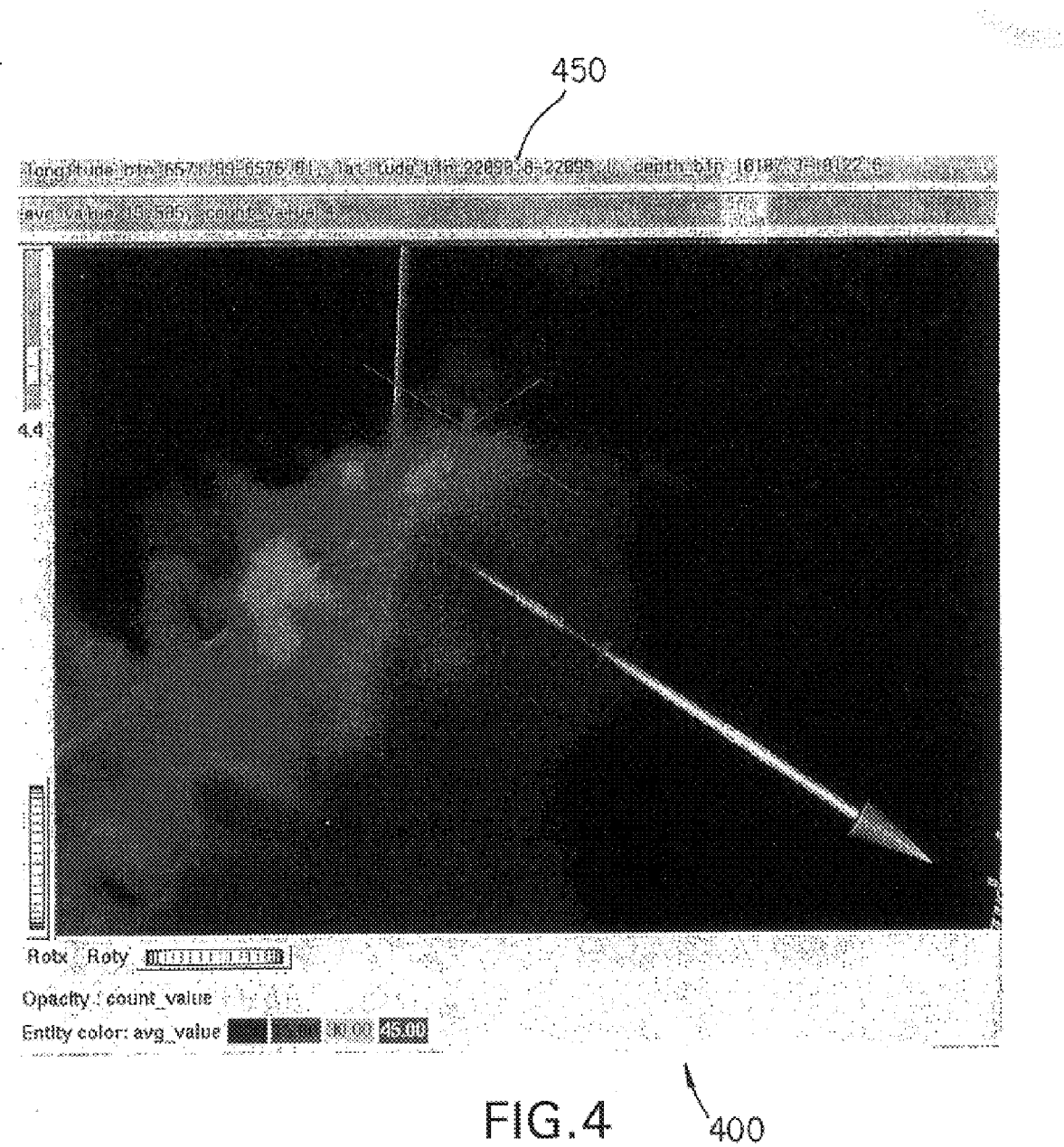
FIG. 4 is a close-up view of the color image of FIG. 3 further showing, textured splats.

FIG. 3 shows an example color image of a three-dimensional splat plot 300 that uses splats to visually approximate scattered data according to the present invention. Splat plot 300 was generated using the sample data described above with respect to Tables 1 and 2. FIG. 4 shows a close-up view 400 of the color image of FIG. 3 which further shows an example of textured splats.

According to a further feature of the present invention, a dragger object is displayed to permit a user to select different regions inside the splat plot 400. The dragger object is shown in this example as a relatively opaque cylinder having reference axes that are parallel to the displayed scatter axes. The draftier object can be manipulated by a user through a mouse or other user-interface control.

Information about a selected region at which the dragger object is located can then be displayed. This information can include the values of the data attributes of the bin at or nearest to the selected region. See, e.g., the top window 450 in FIG. 4 which shows information on interior binned data points at the location of the dragger object, namely, longitude 6571.99–6576.81, latitude 22090.8–22099.1, depth bin 10107.3–10122.6. By moving and selecting different regions using the dragger object, a user can navigate inside a volume rendered image. By reading window 450 a user can scan information on interior binned regions.

According to another embodiment of the present invention, volume rendering involving ray tracing or cell projection can be used to represent bins of aggregated data points. For ray tracing, volumes (e.g. polygons) are rendered by using bin centers as vertices. The bin positions containing no data are assumed to have zero density (completely transparent). At bin positions where data is present, the density is directly proportional to the count of scattered data points. See. e.g., the use of ray tracing in volume rendering in the reprinted article by Levoy, "Display of Surfaces from Volume Data," *IEES Computer Graphics and Applications*, vol. 8, No. 5, May 1988, pp. 29–37 (reprinted pages 135–43) (incorporated herein by reference).

For cell projection, cubes are constructed by using, bin centers as vertices. Again, if a bin with no data is needed as a vertex to complete a cube, that vertex will have an opacity equal to zero. The opacity assigned to the vertices is then a function of the count of scattered data points in a corresponding bin, according to the following equation:

opacity=1−exp(−u*count), where, opacity represent the opacity value of a cube, count represents said count of data points in a corresponding bin, u represents a global scale factor, and exp denotes an exponential function. The transparent cubes arc rendered directly or by using tetrahedral decomposition in a back to front order. See, e.g., the use of cell projection in volume rendering in the articles by Wilhelms and Van Gelder, "A Coherent Projection Approach for Direct Volume Rendering," *Computer Graphics*, vol. 25, No. 4, July 1991, pp. 275–284 (incorporated herein by reference) and Stein el al., "Sorting and Hardware Assisted Rendering for Volume Visualization," IEEIE 1995, pages 83–89 (incorporated herein by reference).

4. Distribution of Categorical Variable Values Mapped to Color

The present invention provides a method, system and computer program product for a new data visualization tool for visualizing large numbers of records with a particular emphasis on categorical variables (or data attributes) that are mapped to color. In an alternate embodiment, the splat color is determined by averaging a numerical variable. As described above, each data point in a scatter plot has one or more variables. Variables can be either numerical or categorical. Categorical variables have nominal values like text strings. For example, a categorical variable representing the make of a car can include the following values: "American," "German," "Japanese," "Canadian.," and "French." Variables can be represented by a scatter plot axis or by being mapped to color. Variables mapped to color are not mapped to a scatter plot axis.

The routine 100 (FIG. 1) described above for visually approximating scattered data explained how to map a numerical variable to color. Specifically, in step 140, an aggregation (e.g., average) value that represents a numerical variable is determined for each bin. Then in step 170, a color transfer function is used to map this average value to a color value for each bin. The result is that when each bin is volume rendered as a splat, each splat is a single color that visually represents the average of the numerical variable. This works well because numerical data is continuous. It should be apparent to one skilled in the art that this approach for numerical variables does not work for categorical variables, such as the make of a car, because the concept of an average is meaningless. Thus, the present invention provides a solution for visualizing information related to a large number of records with categorical variables mapped to color.

The approach of the present invention to map a categorical variable to color involves storing a vector at each record (i.e. bin). The vector is used to represent the distribution of the categorical variable values in the bin. The vector contains as many locations as the number of different values for the categorical variable. For example, the vector for the make of a car above. will have five locations. One to represent "American," one to represent "German," and so forth. The value stored in each location is typically a percentage of the total weight in that bin for the particular value of the categorical variable. Another reason for storing the total bin weight is to determine the opacity and for alternating the number of triangles. To further illustrate this embodiment of the present invention, an example is utilized. The specific example is a sample car data set of data records related to the performance of cars in the market today, as shown in Table 3 below.

TABLE 3

| Original Data | | |
|---|---|---|
| MPG | Horsepower | Make |
| 23 | 135 | American |
| 30 | 250 | German |
| 29 | 250 | German |
| 23 | 150 | Japanese |
| 24 | 140 | French |
| 30 | 135 | French |
| 26 | 130 | Canadian |
| 22 | 140 | Japanese |
| 23 | 145 | Japanese |
| 29 | 135 | American |
| — | — | — |
| — | — | — |
| 21 | 160 | Canadian |

Each data record has three variables characterizing each car sample including "mpg," "horsepower" and "make." Of course, many other variables could also be included in Table 3. In order to visually represent the relationships between these variables, the following method can be used. The processing steps (specifically steps 110, 120 and 130)

described above in connection with FIG. 1 can be utilized to process the original data stored in Table 3. First, variable values to be mapped to axes or sliders are binned. For this example, "mpg" and "horsepower" represent the x and y axes in a 2-D plot. The present invention works in a similar manner for 3-D plots. In this example, a first step is to bin the variables "mpg" and "horsepower" to a desired resolution (see step 110). As described above, binning can be accomplished using known decision support or mining tools having this operation. It is not possible to bin the categorical variable "make." This variable is to be mapped to color. After bin positions are determined (see step 120), an aggregation is performed to compute counts or weights (see step 130).

Figure 12:
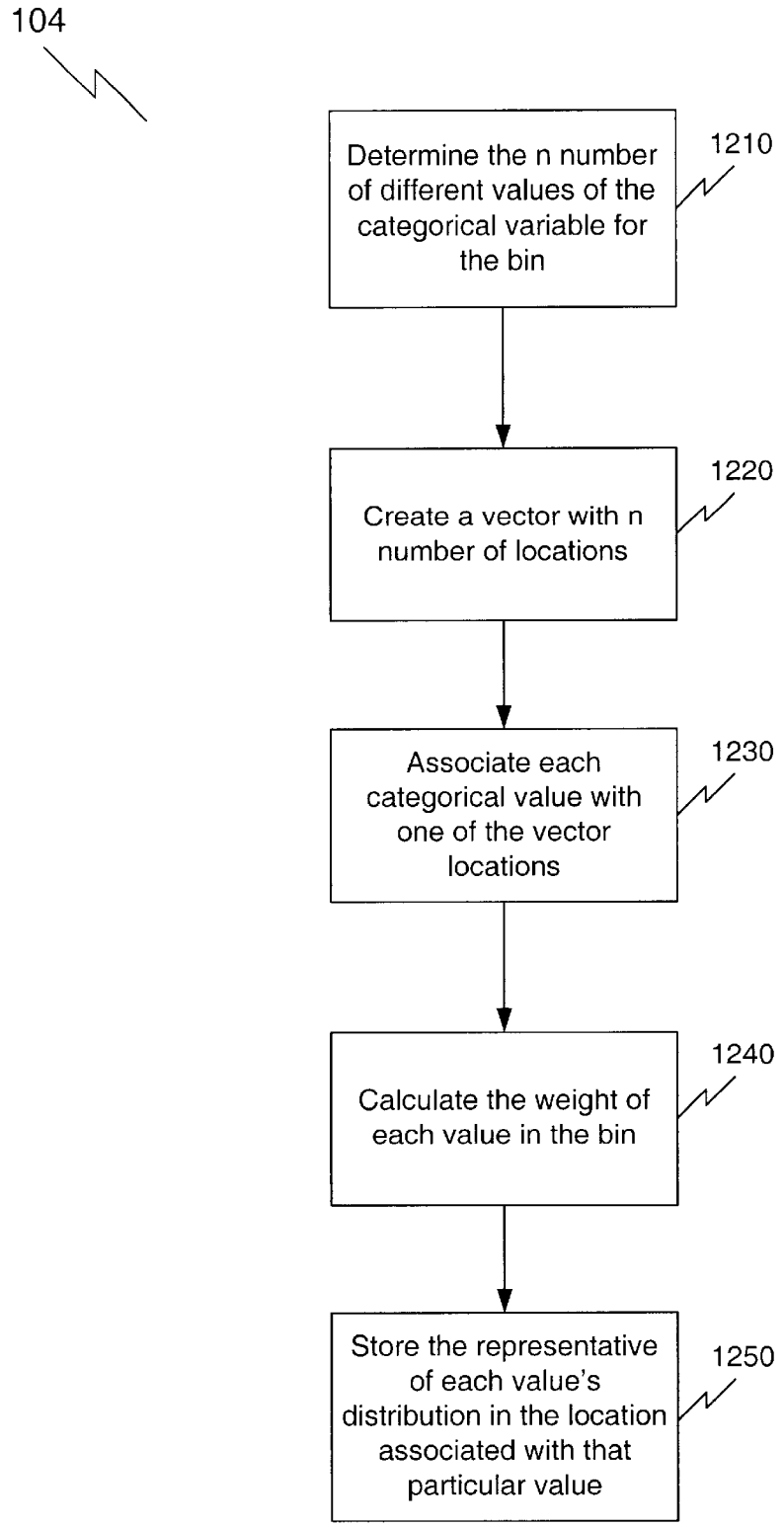
FIG. 12 is a flow chart showing a routine for the distribution technique of the present invention.

As described above in reference to FIG. 1 and step 140, the value of the numeric variable to be mapped to color is averaged for each bin. The present invention alters step 140 to provide a solution for mapping the values of a categorical variable to color. According to the present invention, a distribution technique is performed that represents the distribution of categorical variable values for that bin. This distribution technique is shown in FIG. 12 (replacing step 140). As shown in FIG. 12, after processing steps 110 to 130 described above with reference to FIG. 1, the n number of different values of the categorical variable for the bin is determined in step 1210. This determination step can be made in response to a user input or an automatic setting, such as, a default value. For the "make" variable above, n is five in step 1210 because five different values exist including "American," "German," "Japanese," "Canadian," and "French." This determination is performed automatically by computing the number of distinct values in a set of records to determine the total number of possible values of a categorical variable.

In step 1220, a vector is created with n locations. In the present example, a vector with five locations is created for each bin. In step 1230, each categorical variable value is associated with one of the vector locations. For simplicity, Table 4 below shows each value being represented in the vector by its first letter (e.g.,"A" for "American," "G" for "German," and so forth). In step 1240, the distribution or weight of each value in the bin is calculated. One way to represent the weight is by the percentage of each value in the bin. For example, if one-fifth or 20% of the value "American" is present in the bin, then "20" is the weight calculated in step 1240. This weight is stored in the location associated with "A." These aforementioned steps result in Table 4, shown below.

TABLE 4

| | Processed Data | | |
|---|---|---|---|
| MPG | Horsepower | Make | Weight |
| 12–16 | 100–120 | 20 \| 20 \| 20 \| 20 \| 20 <br> A \| G \| J \| C \| F | 15 |
| 16–20 | 100–120 | 10 \| 1 \| 30 \| 25 \| 25 <br> A \| G \| J \| C \| F | 34 |
| 20–23 | 100–120 | 33 \| 33 \| 20 \| 14 \| 0 <br> A \| G \| J \| C \| F | 102 |

TABLE 4-continued

| | Processed Data | | |
|---|---|---|---|
| MPG | Horsepower | Make | Weight |
| 23–26 | 120–140 | 2 \| 2 \| 30 \| 1 \| 65 <br> A \| G \| J \| C \| F | 69 |
| — | — | — | — |
| 35–40 | 240–260 | 20 \| 20 \| 5 \| 50 \| 5 <br> A \| G \| J \| C \| F | 14 |
| 40–50 | 240–260 | 30 \| 6 \| 4 \| 30 \| 30 <br> A \| G \| J \| C \| F | 55 |

As shown in Table 4, after processing, there are two columns for determining splat positions in a 2-D plot. For a 3-D plot there would be three columns, or alternatively, five columns for a 3-D plot with a 2-D animation slider described below). These columns are "mpg" and "horsepower." There is also one column (here, the "weight" column) corresponding to the number of data points in each bin. The "weight" variable determines the opacity of the splat or the number of opaque triangles in splat texture The "make" column now contains a vector representing the distribution of the "make" variable for each bin. For example, the vector in the last bin (or row) of Table 4 indicates that of the cars that perform at 40–50 MPG and have horsepower in the range 240–260, 30% are American, 6% are German, 4% are Japanese, 30% are Canadian and 30% are French. Note that the percentages (or weights) in a vector always add up to 100%. The present invention is not limited to percentages. A distribution can be any measure that highlights relative differences between the values of categorical variables. Binning, aggregation and distribution can be performed as part of preprocessing or on-the-fly.

At this point the routine of FIG. 12 is completed (replacing step 140 of FIG. 1). Next, splats representative of the bins are rendered in a graphics engine (see step 150). For each bin, the count of scattered data points aggregated in the bin is mapped to a splat opacity or number of small opaque triangles in a fixed texture of triangles (see step 160). As mentioned above, a graphics engine texture maps the opacity value across a polygon to represent a splat.

As described above in reference to FIG. 1 and step 170, a color transfer function is used to map an average value (relating to a numerical variable) to a color value for each bin. The result is that when each bin is volume rendered as a splat, each splat is a single color that visually represents the average of the numerical variable. As stated above, this approach does not work for categorical variables because the concept of an average is meaningless. The present invention alters step 170 for categorical variables mapped to color. For categorical variables, each location in the vector (in each bin) must be mapped to a distinct color. Each distinct color represents a different categorical variable value. for example, assume the following vector from Table 4 is to be mapped to color:

20 \| 20 \| 20 \| 20 \| 20
A \| G \| J \| C \| F

Figure 13:
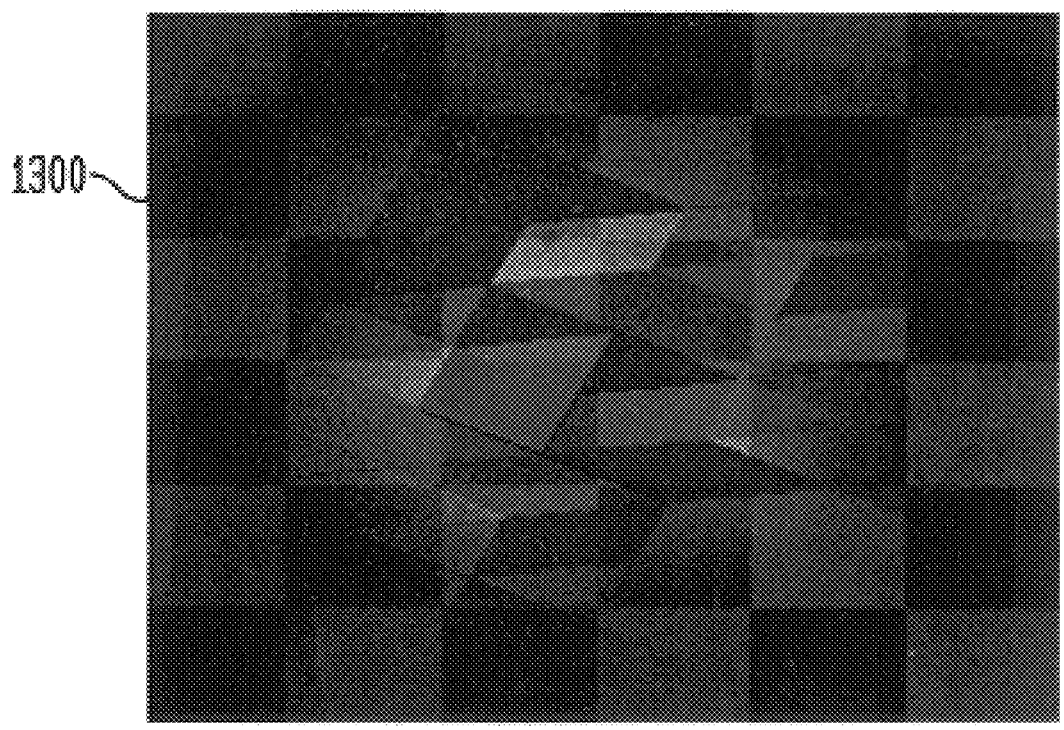
FIG. 13 shows an example color image of a 2-D splat 1300 where the splat is colored with 20% of five different colors.

As described above, each value (e.g. "American," "Gerian," etc.) has equal distribution or weight in the record. Thus, each distinct color in the splat will be weighted equally (i.e., the splat will be colored with 20% of five different colors). The ability to color a single splat with multiple colors requires that the splat texture map be divided into some number of distinct regions. In one example, these regions take on the shape of triangles, where each triangle has the same area as all other triangles in the splat. Therefore, step 170 is altered to allow for the rendering of each vector by looping through each location, and then based on the weight stored in that location, selecting the same percentage (or weight) of randomly placed triangles in the splat texture for the color associated with that location. The result is changes in color within the splat that can be seen on a per triangle basis. FIG. 13 shows an example color image (or a checkerboard background) of a 2-D splat 1300 where the splat is colored with 20% of five different colors.

Figure 14:
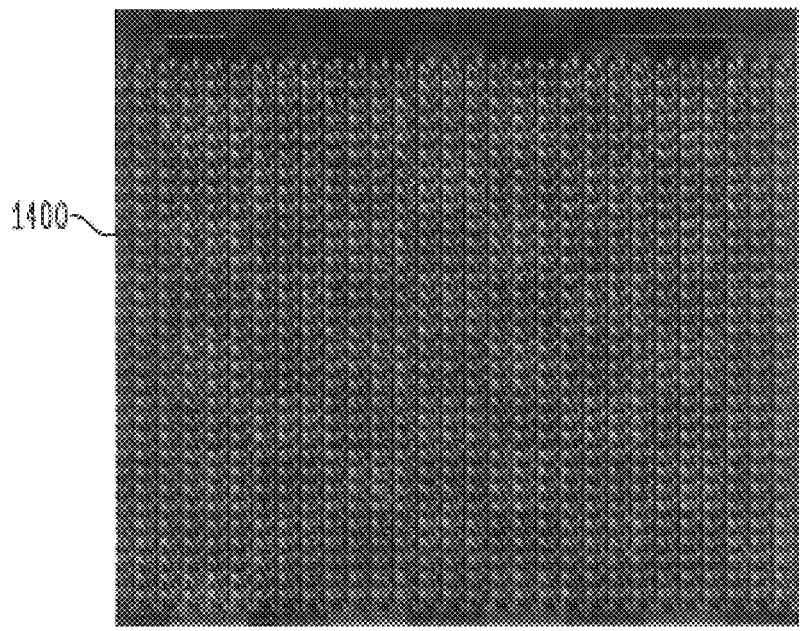
FIG. 14 shows an example color image of a 2-D plot 1400 whose splats were oriented in a fairly uniform pattern of constant proportions resulting in a regular pattern.
Figure 15:
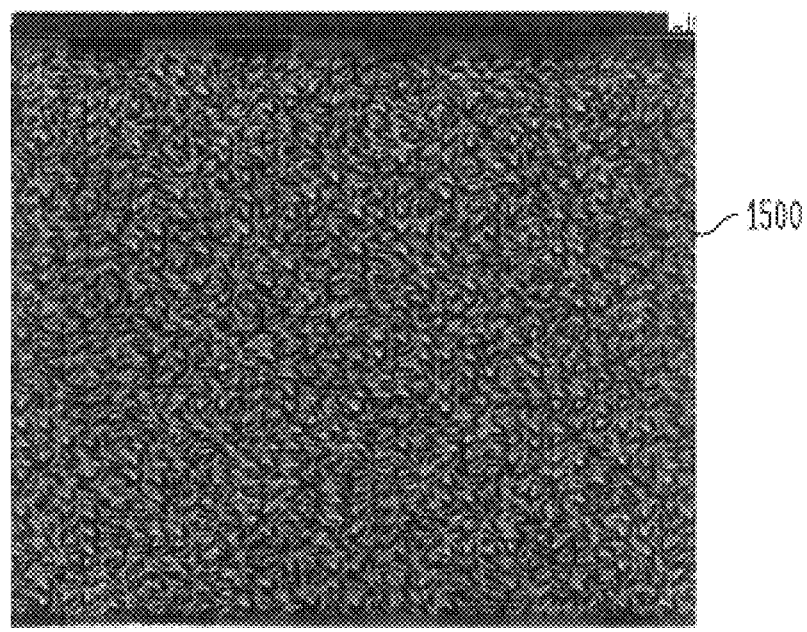
FIG. 15 shows an example color image of a 2-D plot 1500 (having the same distribution as plot 1400) where random rotations were used for the splats to eliminate regular patterns.

According to one feature of the present invention the orientation of the splat is random. This random orientation helps to avoid disturbing and irrelevant patterns in the data due to the regular binning of data or the regular coloring of the triangles. FIGS. 14 and 15 help to illustrate this point. FIG. 14 shows an example color image of a 2-D plot 1400 whose splats were oriented in a fairly uniform pattern of constant proportions. Plot 1400 is colored to reflect the equal distribution of the categorical variable values. Notice the undesirable regular pattern artifacts present in plot 1400. In contrast FIG. 15 shows an example color image of a 2-D plot 1500 (having the same distribution as FIG. 14) whose composite splats were randomly selected.

In the above example from Tables 3 and 4, the distinct colors where limited to five because the "make" categorical variable was limited to five values. It is easy to recognize that other real data may have many distinct data values. This could result in a plethora of distinct colors with very small weights stored in each location of a vector. To reduce the confusion that would result from this, the present invention pre-filters the data and sums all weights below a certain threshold lumping them into a single value labeled "other." The use of a threshold also helps to avoid the computational expense of rendering so many values in a bin.

The technique allows only the categorical data values with weights greater than a user specified percentage threshold to be represented in the splat. By representing only these values, a problem arises on how to represent the correct proportion of each value within the splat. For example, if a vector contains several weights that are 5% or less, and three additional values which are of 8%, 13% and 21% of the bin's weight, it is desirable to have the splat faithfully represent the 8%, 13% and 21%, while obfuscating the remaining weights. Note that by scaling the 8%, 13% and 21% proportions up to cover 100% of the triangles in the splat it will lead to misinterpretations of the data.

Figure 17:
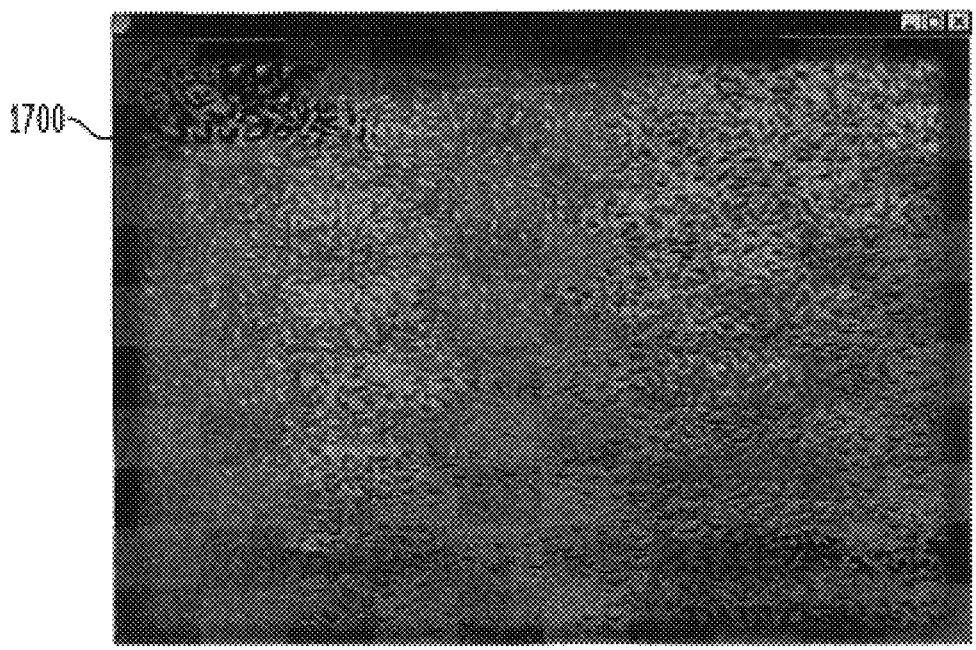
FIG. 17 shows an example color image of a 2-D splat 1700 that has a threshold of 15%.
Figure 18:
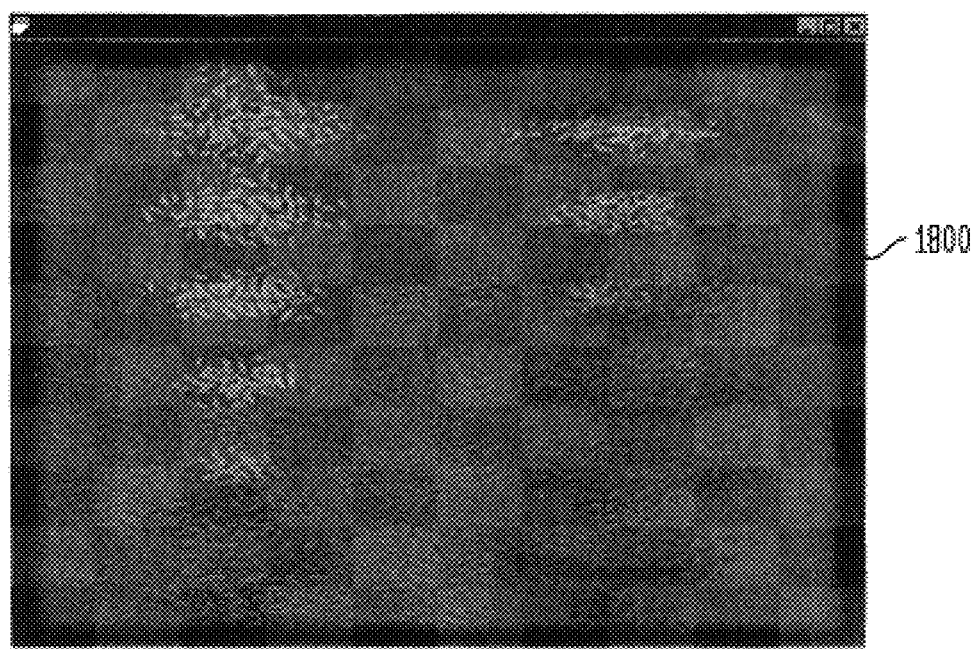
FIG. 18 shows an example color image of a 2-D splat 1800 that has a threshold of 40%.

The present invention solves this problem by grouping the remaining weights that are not to be represented in the splat into a new single value and assign this value a distinct neutral color (e.g., gray). The weights within the vector still add up to 100%. An illustration of this technique is explained in reference to FIGS 16A and 16B. In FIG. 16A, vector 1610 represents the distribution of a categorical variable that has 21 different values. These values are represented by "a" through "u." If the threshold is set at 6%, then vector 1610 contains 18 values with weights less than 6%. The present invention combines these weights and assigns a new value ("other," for example). This is illustrated in FIG. 16B. Vector 1620 represents the same categorical variable as FIG. 16A with the 18 values combined into one value represented by new value "other." The weight of "other" is 58, the combination of all the weights less than threshold 6. Here, 58% of the triangles in the splat will be colored a neutral color. As seen in FIGS. 17 and 18, the color gray is associated with this new value. FIG. 17 shows an example color image of a 2-D splat 1700 that has a threshold of 15%. This means that only colors which have 15% or greater of the bin weight get shown. All others are colored gray. FIG. 18 shows an example color image of a 2-D splat 1800 that has a threshold of 40%. Here, only colors which have 40% or greater of the bin weight get shown and all others are colored gray.

Referring again to vector 1610 of FIG. 16A, the 21 different values represented by "a" through "u" each have a different color associated with it. For example, the value "a" may represent the color "red," the value "b" may represent the color "purple," and so forth. As shown in vector 1620 of FIG. 16B, once all weights below a threshold are combined not every value is represented in the vector. For example, vector 1620 no longer represents the value "a." A problem arises on how to identify the correct color of each value in the vector. The present invention solves this problem by storing a single table in memory that identifies the corresponding color of each value of the categorical variable. An example of such a table for vectors 1610 and 1620 is shown below:

| red | purple | dark blue | yellow | light blue | ... | light green | orange | gray |
|---|---|---|---|---|---|---|---|---|
| a | b | c | d | e | ... | t | u | other |

Each bin in the table has an index into this table. This saves computer memory because each bin in the table does not have to store the corresponding color of each value of the categorical variable.

A slider or other controller can be used to vary the value of the threshold. This allows for the global scaling of the color or distribution for each splat to make an entire display image of rendered splats more or less neutral in color. This scaling by the threshold, while impacting the entire image, is not linear. A splat's coloring is scaled differently depending on the weights within its vector, that is, the distribution of categorical variable values the splat represents. Although the present invention was illustrated in reference to a 2-D plot, the basic approach described above is identical for a 3-D plot.

5. Interpolation of Nutmeric and Relational Data sets

The present invention describes a method, system, and computer program product that provides smooth animation of graphics between approximated scatter plots of numeric and/or relational data sets for the purpose of animation along several dimensions. Most scientific volumetric data sets have several independent attributes (variables) which correspond to spatial dimensions, a possible time dimension (usually used for animation), and one or more dependent variables (scalar, vector, or tensor) which have real values defined throughout the domain of the independent variables. As discussed above, one of these scalar values can be mapped to color when volume rendering. Also discussed above, is a method of mapping categorical variable values to color when volume rendering.

Unlike physical data sets, relational databases have many attribute columns that are categorical (e.g., education, occupation) rather than numerical. Thus, relational data bases may not have attributes (variables) that map directly to physical parameters, such as time, space, or density. According to the present invention, for purposes of visualization, assignments can be given to relational databases so that otherwise abstract quantities can be well understood.

As mentioned above, any conventional binning technique (uniform or non-uniform) can be used to bin numeric (i.e. real-valued) attributes and categorical attributes. If a categorical attribute is mapped to an axis then the binning is defined to be the distinct values of that attribute, or some grouping of these values based on metadata. In the present invention, for example, uniform binning can be used to discretize the real variables mapped to spatial axes and to create independent slider dimensions. Unique values can define the bins for categorical axes. According to a preferred embodiment of the present invention, a table is used as a data structure for representing the visualization.

To further illustrate this embodiment of the present invention, an example of a relational data set is shown below. Table 5 displays a set a related variables before processing. In this example, Table 5 contains approximately 150,000 rows of data. The variables shown in Table 5 include "income," "education," "occupation," "age," "hours worked," and "marital status." Of course, many other variables could also be included in Table 5.

TABLE 5

Original Data

| Income | Education | Occupation | Age | Hrs worked | Marital Status |
|---|---|---|---|---|---|
| 0 | HS-grad | Other-services | 46 | 5 | Divorced |
| 0 | HS-grad | Other-services | 46 | 5 | Married |
| 37440 | Bachelors | Exec-man . . . | 57 | 50 | Married |
| 0 | Preschool | Craft-repair | 5 | 0 | Separated |
| 27300 | Bachelors | Adm-clerical | 23 | 40 | Single |
| 24410 | HS-grad | Craft-repair | 24 | 42 | Single |

TABLE 5-continued

Original Data

| Income | Education | Occupation | Age | Hrs worked | Marital Status |
|---|---|---|---|---|---|
| 59127 | HS-grad | Tech-support | 40 | 40 | Widowed |
| — | — | — | — | — | |
| — | — | — | — | — | |
| 5000 | 9th | Adm-clerical | 66 | 12 | Spouse Absent |

In order to visually represent the relationships between these variables, the following method can be used. The processing steps (specifically steps 110, 120, 130, and 140) described above in connection with FIG. 1 can be utilized to process the original data set stored in Table 5. First, any numeric values that are to be mapped to axes or external query dimensions are binned. For this example, education level ("education"), "occupation," and hours worked per week ("hours worked") represent the x, y, and z axes in a plot. "Age" will be shown as an external query slider, thus allowing changes in distribution as "age" is varied. In this example, a first step is to bin the variables "age" and "hours worked" to a desired resolution (see step 110). As described above, binning can be accomplished using known decision support tools having this operation.

A dependent variable, "income," is left unbinned: this variable is to be mapped to color. Alternatively, the categorical variable "marital status" could be mapped to color. After bin positions are determined (see step 120), an aggregation is performed to compute counts (see step 130). Additionally, averages for "income" are computed using the binned and numeric variables as keys (see step 140). As discussed above, because categorical variable "marital status" is to be mapped to color, a vector of weights is computed for each bin. For simplicity, Table 6 below shows each value of "marital status" being represented as follows: "a" for "married," "b" for "divorced," "C" for "separated," "d" for "single," "e" for "widowed," and "f" for "spouse absent." These aforementioned steps result in Table 6, shown below.

TABLE 6

Processed Data

| Education | Occupation | Age | Hours worked | Average income | Count | Marital Status |
|---|---|---|---|---|---|---|
| HS-grad | Tech-support | –20 | –20 | 2543.8 | 4 | 5\|5\|0\|80\|10\|0 / a\|b\|c\|d\|e\|f |
| HS-grad | Tech-support | 20–30 | 35–40 | 23927.2 | 53 | 3\|72\|0\|25\|0\|0 / a\|b\|c\|d\|e\|f |
| — | — | — | — | — | — | |
| HS-grad | Exec-man... | –20 | 45–50 | 23000.0 | 1 | 1\|90\|1\|2\|6\|0 / a\|b\|c\|d\|e\|f |
| HS-grad | Exec-man... | 20–30 | –20 | 20996.5 | 3 | 10\|10\|20\|0\|0\|50 / a\|b\|c\|d\|e\|f |
| HS-grad | Exec-man... | 20–30 | 25–30 | 7500.8 | 2 | 33\|33\|0\|33\|0\|1 / a\|b\|c\|d\|e\|f |

TABLE 6-continued

Processed Data

| Education | Occupation | Age | Hours worked | Average income | Count | Marital Status |
|---|---|---|---|---|---|---|
| HS-grad | Exec-man... | 20–30 | 30–35 | 19086.4 | 2 | 0/5/15/80/0/0 — a/b/c/d/e/f |
| HS-grad | Exec-man... | 20–30 | 35–40 | 29863.0 | 17 | 10/20/20/30/10/10 — a/b/c/d/e/f  z |
| HS-grad | Exec-man... | 30–40 | 40–45 | 25946.2 | 58 | 1/90/1/2/6/0 — a/b/c/d/e/f |
| — | — | — | — | — | — | |
| Masters | Machine-op | 50–06 | –20 | 17269 | 1 | 5/5/0/80/10/0 — a/b/c/d/e/f |
| Masters | Machine-op | 70+ | 25–30 | 37644 | 1 | 3/72/0/25/0/0 — a/b/c/d/e/f |
| Masters | Machine-op | 20–30 | 35–40 | 0 | 1 | 1/90/1/2/6/0 — a/b/c/d/e/f |
| Masters | Machine-op | 20–30 | 40–45 | 20000 | 1 | 10/10/20/0/0/50 — a/b/c/d/e/f |
| — | — | — | — | — | — | |
| Preschool | Priv-house... | 20–30 | –20 | 0 | 2 | 33/33/0/33/0/1 — a/b/c/d/e/f |
| Preschool | Priv-house... | 40–50 | 25–30 | 0 | 1 | 10/10/20/0/0/50 — a/b/c/d/e/f |
| Preschool | Priv-house... | 40–50 | 35–40 | 5000 | 2 | 0/5/15/80/0/0 — a/b/c/d/e/f |
| Preschool | Priv-house... | 60–70 | 30–35 | 12200 | 1 | 3/72/0/25/0/0 — a/b/c/d/e/f |

As shown in Table 6, after processing there are up to three columns for I10 variables mapped to axes in a 3-D plot. These columns are "education," "occupation," and "hours worked." There is also one column (here, the "count" column) corresponding to the number of data points in each row (or bin). This sum of record weights in a bin is used to determine opacity. There is one numeric column (here, the "income" column) which represents the average value of aggregated data in each bin. This "income" column is used to map color. The categorical column representing "marital status" could alternatively be used to map color. Finally, there may be additional columns corresponding to other variables which are to be used for external slider dimensions (or other external interactive query devices for interactively selecting slices of the multi-dimensional space). In this example, the "age" column is used for this purpose. Alternatively, in some cases, it may be desirable to weight records by the value of some other variable, rather than simply counting once for each record. For example, there may be a row for every town in a geographical region and a column for population. In this case, each record can instead be weighted by population.

Binning and aggregation can be performed as part of preprocessing. For example, according to one embodiment of the present invention, this preprocessing can be performed on the server where the database resides. Only a processed table, such as Table 6, need be returned to the client for visualization. For example, Table 6 represents a processed Table having approximately 4,800 rows and 6 columns, where the original Table 5 included approximately 150,000 rows and 200 columns.

Figure 8:
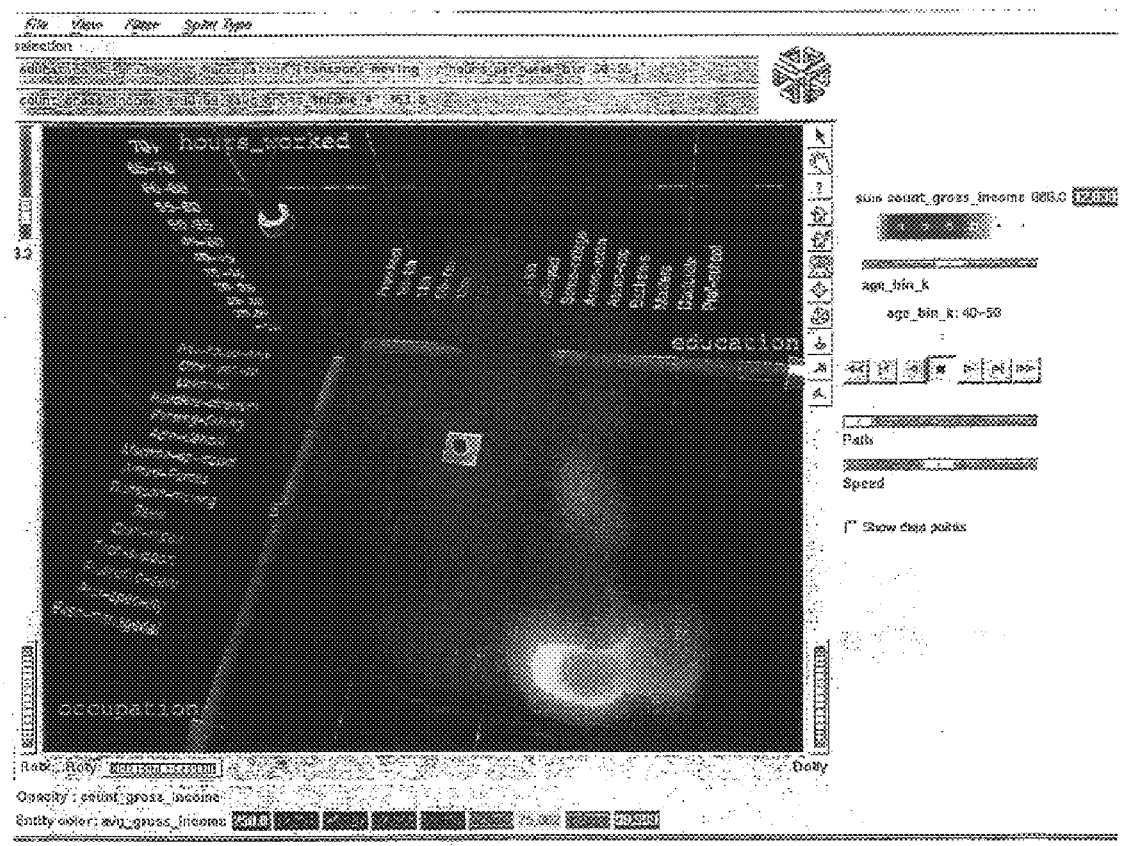
FIG. 8 is an example color image of a three-dimensional splat plot that plots "education." "occupation," and "hours worked," where "income" is mapped to color, and an external slider is used to animate over "age."

FIG. 8 shows a sample splat plot visualizing the processed data from Table 6. Here, the spatial axes are "occupation," "education," and "hours worked." "Income" is mapped to color, as indicated by the color scale shown at the bottom of the plot. The external slider in the upper right quadrant of FIG. 8 is used to animate over "age." The splat plot shown in FIG. 8 represents data for persons aged 40–50 years old.

In order to visually represent trends in the data, it is useful to animate the visualization over a particular variable.

Preferably, this animation is accomplished by tracing a path on one of the external slider dimensions. In this example, as shown in FIG. 8, the "age" dimension is binned to provide a densely populated scatter plot at any of a finite number of positions along the slider. Recall that if the binning is too highly resolved the resulting image can be too noisy to give a useful image. High resolution binning reduces the count in each bin and hence the statistical significance. With more data, more highly resolved binning is possible without loss of usefulness. According to the present invention, between discrete slider positions, scatter plots are interpolated in order to provide smooth animation.

According to this embodiment of the present invention, there can be a separate table for each binned positioned on an external query slider (representing a continuous variable). In this example, "age" is used as the slider dimension, which corresponds to 7 separate bins or discrete external slider positions (e.g., under 20, 20–30, ..., and 60 and over). The separate tables generated corresponding to adjacent bins on an external slider need not have the same number of rows because the differences in data distribution change from one position to the next. For example, in FIG. 8, if the visualization is changed from showing 40–50 year olds to showing 50–60 year olds by moving a slider control one discrete position to the right, some bins may contain data where there was none before, and vice versa. Recall that each row in a table corresponds to a bin.

Figure 9A:
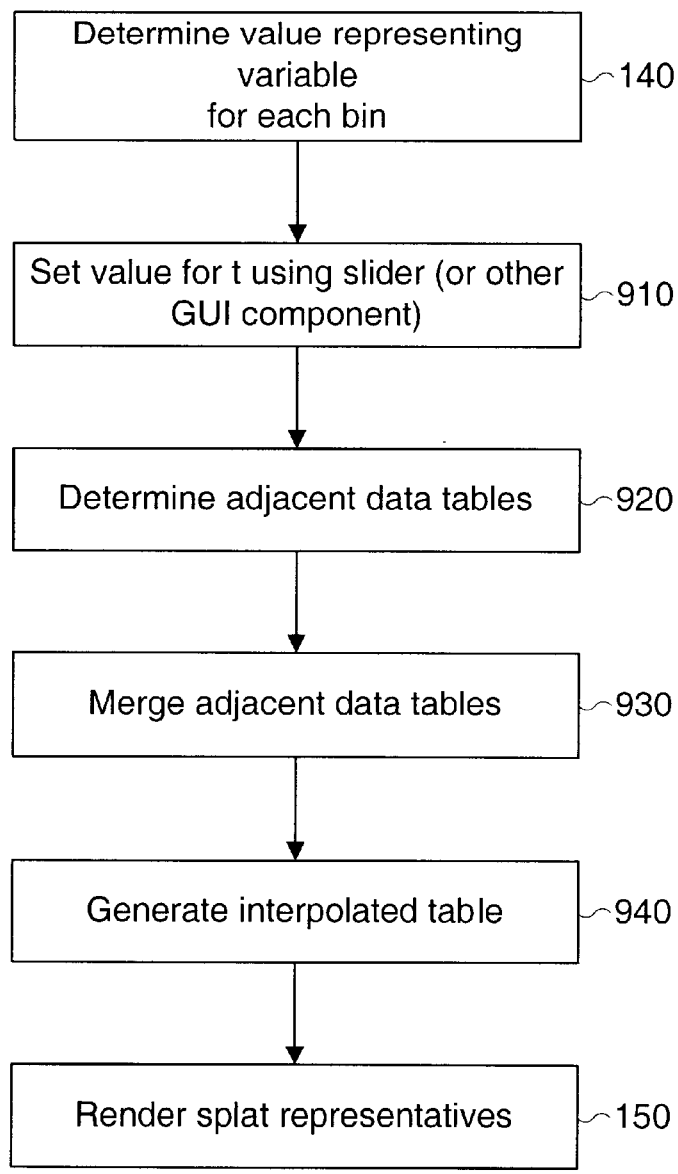
FIGS. 9A and 9B are flow charts showing routine for animating an external query attribute of a scatter plot of data points.

According to the present invention, an interpolation technique is performed to provide animation of an external query attribute. For example, this interpolation technique can be performed in an interpolation module that is part of a computer graphics environment. This interpolation technique is shown in flow chart form in FIGS. 9A and 9B. As shown in FIG. 9A, after processing steps 110 to 140, described above with reference to FIG. 1, a variable t is set (step 910). This t variable corresponds to a slider control position between two discrete external slider positions. Next, adjacent data structures are determined based on the external slider control position (step 920). In this embodiment, data tables are utilized as the data structures. Then, the adjacent data structures are merged together (step 930). Once the adjacent data structures are merged, interpolated bins are generated for those bins with the same spatial axes columns (step 940). Subsequently, splat representatives are rendered and displayed, as described above with respect to steps 150–180 shown in FIG. 1.

For example for interpolation on a one dimensional (1-D) external slider, two adjacent tables are merged together, then aggregated using the spatial axes columns as unique keys. The count is then linearly interpolated. A zero ("0") count is assumed if one of the tables lacks a particular row. An average value used for color is also interpolated, but weighted by the count. In the case of categorical variable values, we must interpolate the distribution represented by weights in the vectors. These steps are illustrated below in Tables 5–8.

In this example, Table 7 and Table 8 represent adjacent "age" bins, where Table 7 corresponds to age value =20–30 and Table 8 corresponds to age value=30–40. Each Table also corresponds to a particular position on the external slider scale (e.g., the second and third discrete positions on the external slider shown in FIG. 8). According to the present invention, an image representing an interpolated scatter plot can be provided corresponding to any given position along an external slider scale.

TABLE 7

20–30 year-olds

| Education | Occupation | Hours worked | Income | Count | Marital Status |
|---|---|---|---|---|---|
| HS-grad | Exec-Man. | 15–25 | 25000 | 2 | 10\|20\|20\|30\|10\|10 / a\|b\|c\|d\|e\|f |
| HS-grad | Mach-op | 45–55 | 30000 | 1 | 5\|5\|0\|80\|10\|0 / a\|b\|c\|d\|e\|f |
| Masters | Technician | 25–35 | 35000 | 3 | 5\|5\|0\|80\|10\|0 / a\|b\|c\|d\|e\|f |
| . | . | . | . | . | . |
| . | . | . | . | . | . |
| . | . | . | . | . | . |

TABLE 8

30–40 year-olds

| Education | Occupation | Hours worked | Income | Count | Marital Status |
|---|---|---|---|---|---|
| HS-grad | Exec-Man. | 15–25 | 70000 | 1 | 12\|28\|0\|25\|25\|10 / a\|b\|c\|d\|e\|f |
| vocational | Mach-op | 35–45 | 40000 | 2 | 5\|5\|0\|80\|10\|0 / a\|b\|c\|d\|e\|f |

TABLE 8-continued

30–40 year-olds

| Education | Occupation | Hours worked | Income | Count | Marital Status |
|-----------|------------|--------------|--------|-------|----------------|
| . | . | . | . | . | . |
| . | . | . | . | . | . |
| . | . | . | . | . | . |

In this example, a user (or viewer) is moving the slider control from age value 20–30 to age value 30–40. In order to show an image representing a given position along the slider scale, an interpolation routine is performed to create a new table that estimates the attributes as a function of the position between the values given in adjacent Tables 5 and 6.

In this example, a variable t is used to represent an intermediate position along the slider scale a user chooses. Thus t can range from zero (0) to one (1). In this example, a value of t=0 corresponds to the slider control being located on the second discrete position of the slider scale, and a value of t=1 corresponds to the slider control being located on the third discrete position of the slider scale. Additionally, only a few bins of adjacent Tables 5 and 6 are shown for simplicity.

Figure 9B:
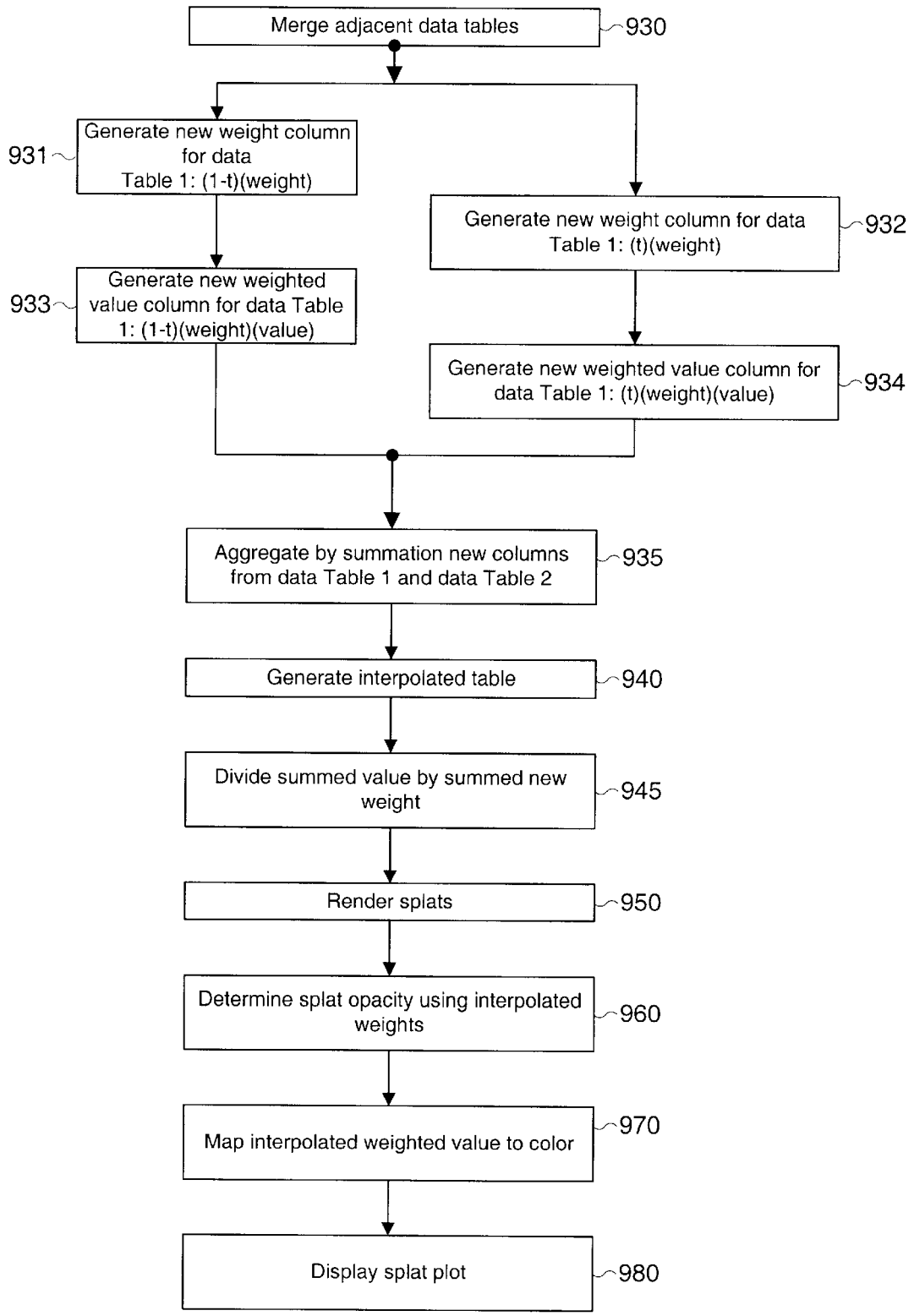

As illustrated in FIG. 9B, an interpolation routine can be described as follows. As part of step 930 (merging adjacent data structures together), a new count column is added (step 931) to Table 7. This new count column is equal to (1−t) count. Next, a new weighted value column is added (step 933) to Table 7. The new weighted value column is equal to (1−t) (count) (value). Similarly, a new count column is added (step 932) to Table 8. This new count column is equal to (t)(count). A new weighted value column is also added (step 934) to Table 8. This new weighted value column is equal to (t) (count) (value). A new weighted value for the marital status column is also added. Here, for each location in the vector, the weight associated with it gets set equal to (t)(count)(weight). These two new tables are merged together. For t=0.5 (corresponding to a mid-point position between the second and third discrete positions on the slider scale), the merged data appears as illustrated below in intermediate Table 9.

TABLE 9

Merged Data

| Education | Occupation | Hrs worked | Income | Count | New count | Weighted value | Weighted Marital Status |
|-----------|------------|------------|--------|-------|-----------|----------------|-------------------------|
| HS-grad | Exec-Man. | 15–25 | 25000 | 2 | 1 | 25000 | 10\|20\|20\|30\|10\|10 <br> a\|b\|c\|d\|e\|f |
| HS-grad | Exec-Man. | 15–25 | 70000 | 1 | .5 | 35000 | 6\|14\|0\|12.5\|12.5\|5 <br> a\|b\|c\|d\|e\|f |
| HS-grad | Mach-op | 45–55 | 30000 | 1 | .5 | 15000 | 5\|5\|0\|80\|10\|0 <br> a\|b\|c\|d\|e\|f |
| Masters | Tech. | 25–35 | 35000 | 3 | 1.5 | 52500 | 5\|5\|0\|80\|10\|0 <br> a\|b\|c\|d\|e\|f |
| vocational | Mach-op | 35–45 | 40000 | 2 | 1 | 40000 | 5\|5\|0\|80\|10\|0 <br> a\|b\|c\|d\|e\|f |
| . | . | . | . | . | . | | |
| . | . | . | . | . | . | | |
| . | . | . | . | . | . | | |

Note that Table 9 is shown here to illustrate the merged data before interpolation.

All of the unique rows have been identified using the spatial axes columns as keys. For example, the first and second bins of Table 9 have identical spatial axes columns (HS-grad, Exec-Man., and 15–25 hrs.). In order to perform interpolation, the two new columns (columns 6 and 7 of Table 9) are aggregated by summation (step 935). As a result, no two rows have the same binned values for all the spatial axes. In other words, the first and second bins of Table 9 are merged into a single bin. Recall that a zero ("0") count is assumed if one of the tables lacks a particular row. This interpolated bin is generated by dividing the summed value by the summed count to generate the interpolated values (step 945). In this case the interpolated values are for "income." Here, the interpolated value for the first and second bins of Table 9 is determined by: (25000+35000)/(1.5)=40000. In the case where the interpolated values are for "marital status," the interpolated weights (in the vector) for the first and second bins are determined by: (10+6)/(1.5)=10.7 for value "a;" (20+14)/(1.5)=22.7 for value "b;" (20+0)/(1.5)=13.3 for value "c;" (30+12.5)/(1.5)=28.3 for value "d;" (10+12.5)/(1.5)=15 for value "c;" and (10+5)/(1.5)=10 for value "f." Note that the percentages (or weights) in each vector still add up to approximately 100 percentage after the interpolation. The resulting interpolated data used for plotting (step 950) the interpolated scatter plot (for t=0.5) is illustrated below in Table 10.

TABLE 10

Interpolated Table

| Education | Occupation | Hrs worked | Income | Count | Marital Status | | | | | |
|---|---|---|---|---|---|---|---|---|---|---|
| HS-grad | Exec-Man. | 15–25 | 40000 | 1.5 | 10.7 a | 22.7 b | 13.3 c | 28.3 d | 15 e | 10 f |
| HS-grad | Mach-op | 45–55 | 30000 | .5 | 0 a | 5 b | 15 c | 80 d | 0 e | 0 f |
| Masters | Technician | 25–35 | 35000 | 1.5 | 0 a | 5 b | 15 c | 80 d | 0 e | 0 f |
| Vocational | Mach-op | 35–45 | 40000 | 1 | 0 a | 5 b | 15 c | 80 d | 0 e | 0 f |
| . | . | . | . | . | | | | | | |
| . | . | . | . | . | | | | | | |
| . | . | . | . | . | | | | | | |

Thus, at a mid-point between the second and third discrete positions of the external slider scale, an image corresponding to the interpolated values shown in Table 10 is presented to a viewer. The interpolated counts are mapped to splat opacity (step 960). The interpolated weighted values are mapped to color (step 970). Finally, the splat plot at the midpoint slider control position is displayed to a viewer (step 980). In this example, the opacity of a particular splat corresponding to a particular bin is proportional to the count shown in column 5 of Table 10.

Figure 10A:
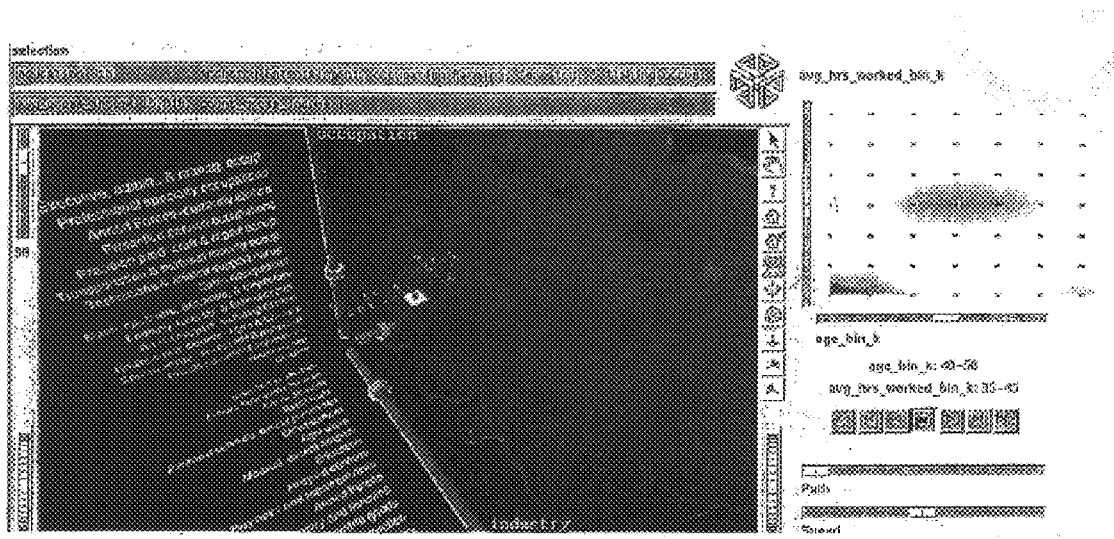
FIGS. 10A and 10B are example three-dimensional splat plots using a two dimensional external slider used to animate over "age" and "hours worked."
Figure 10B:
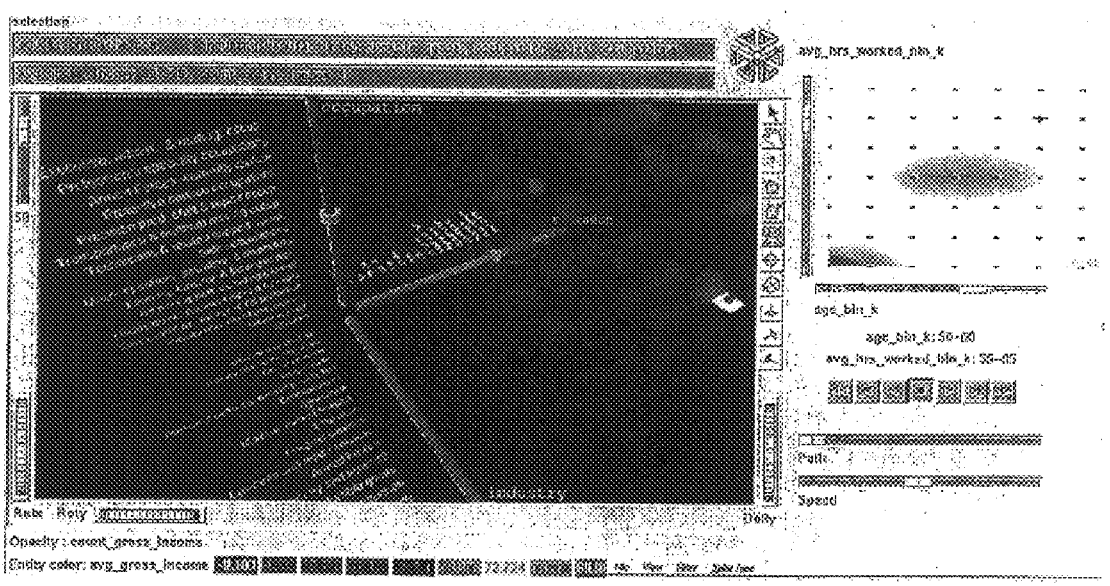

According to the present invention, a similar interpolation routine is performed if the external query slider has two dimensions. FIGS. 10A and 10B illustrate resulting images when bilinear interpolation is used. In this example, the illustrated census data set contains approximately 150,000 rows. The spatial axes shown are "industry," "occupation," and "education," where "age" and "hours worked" are the external slider dimensions (the horizontal and vertical scales, respectively). An example 2-dimensional (2-D) external slider summary window with corresponding vertical and horizontal external sliders is shown in the upper right quadrant of FIGS. 10A and 10B. As described above, the purpose of the external slider is to allow navigation through, and show the density of the data for additional dimensions in the data. Grid points are displayed in the summary window to aid in the querying and navigation of data in the summary window. A user can query data by horizontal and vertical moving slider controls to vary the external dimensions at which data visualization is displayed. The summary window allows the user to preview specific regions of interest in which to move the slider controls, thereby allowing the user to target the data query more efficiently. The data visualization will then be updated based on the processes described above to reflect the actual or interpolated data at the point selected by the user. As shown in FIGS. 10A and 10B, the red regions in the summary window represent places where the data is dense, while white shows data areas that are sparse.

For example, FIG. 10A shows the 2-D external slider controls as selecting two 3-D slices of the data: people who are aged 40–50 and work 35–45 hours per week. The image in FIG. 10A is fairly opaque because the point selected by the user corresponds to a place where the data is dense. In contrast, FIG. 10B shows the 2-D external slider controls as selecting people who are aged 50–60 and work 55–65 hours per week. The resulting image is much less opaque because the point selected by the user corresponds to the sparse data (as indicated by the white regions of the summary window). When the slider controls are positioned over a black point within the summary window, the image shows uninterpolated data. If the slider is positioned over an intermediate region within the summary window, the image shows interpolated data generated by the processes described above.

According to the present invention, a user can trace out a path on the slider and animate over it using the tape player like control panel located directly below the horizontal slider scale in FIGS. 10A and 10B. Furthers it may be possible to have the volume rendered scatter plot itself act as an external slider to a second scatter plot or other visual tool.

Also according to the present invention, special considerations need to be made with interpolation when a categorical variable is mapped to color and a threshold is used to help reduce confusion and decrease processing time by summing all weights in the vector below the threshold and assigning to it a single neutral color (as previously described in reference to FIGS. 16A and 16B). An illustration of the special considerations is explained in reference to FIGS. 19 and 20. In FIG. 19, vectors 1910 and 1920 each represent a different bin of a categorical variable that has 21 different values. These values are represented by "a" through "u." If the threshold is set at 6%, then vector 1910 contains 18 values with weights less than 6%. As described above, the present invention combines these weights and assigns a new value "other." This is illustrated in vector 1930. A similar process occurs for vector 1920. Here. with the threshold again at 6%, vector 1920 contains 15 values with weights less than 6%. Once these weights are combined, vector 1920 becomes vector 1940.

Referring again to vectors 1930 and 1940, assume these two vectors need to be interpolated. A problem arises because the vectors have different values. Vector 1930 has values "b," "c," "k" and "other." Vector 1940 has values "b," "j," "k," "l," "n," "r" and "other." To solve this problem, the present invention expands both vectors to include the same values. For each value a vector is expanded to include, a weight of zero is assigned to that value. This is illustrated in FIG. 20. Once expanded, vector 1930 becomes vector 2010 and vector 1940 becomes vector 2020.

Prior to interpolation, the data in vectors 2010 and 2020 need to be merged as described above in reference to Table 9. Using the same example as above (i.e., t=0.5 corresponding to a mid-point position between the second and third discrete positions on the slider scale), the merged data appears as illustrated in vector 2030 and vector 2040. The interpolation of vector 2030 and vector 2040 is illustrated in vector 2050. Specifically, (13+4.5)/(1.5)=11.7 for value "b;" (8+0)/(1.5)=5.3 for value "c" (0+3.5)/(1.5)=2.3 for value "j;" (21+5.5)/(1.5)=17.6 for value "k;" (0+4.5)/(1.5)=3 for value "l; " (0+6.5)/(1.5)=4.3 for value "n;" (0+10.5)/(1.5)=7 for value "r;" and (58+15)/(1.5)=48.7 for value "other." Note that the percentages (or weights) in vector 2050 add up to approximately 100 percentage after the interpolation.

Figure 11:
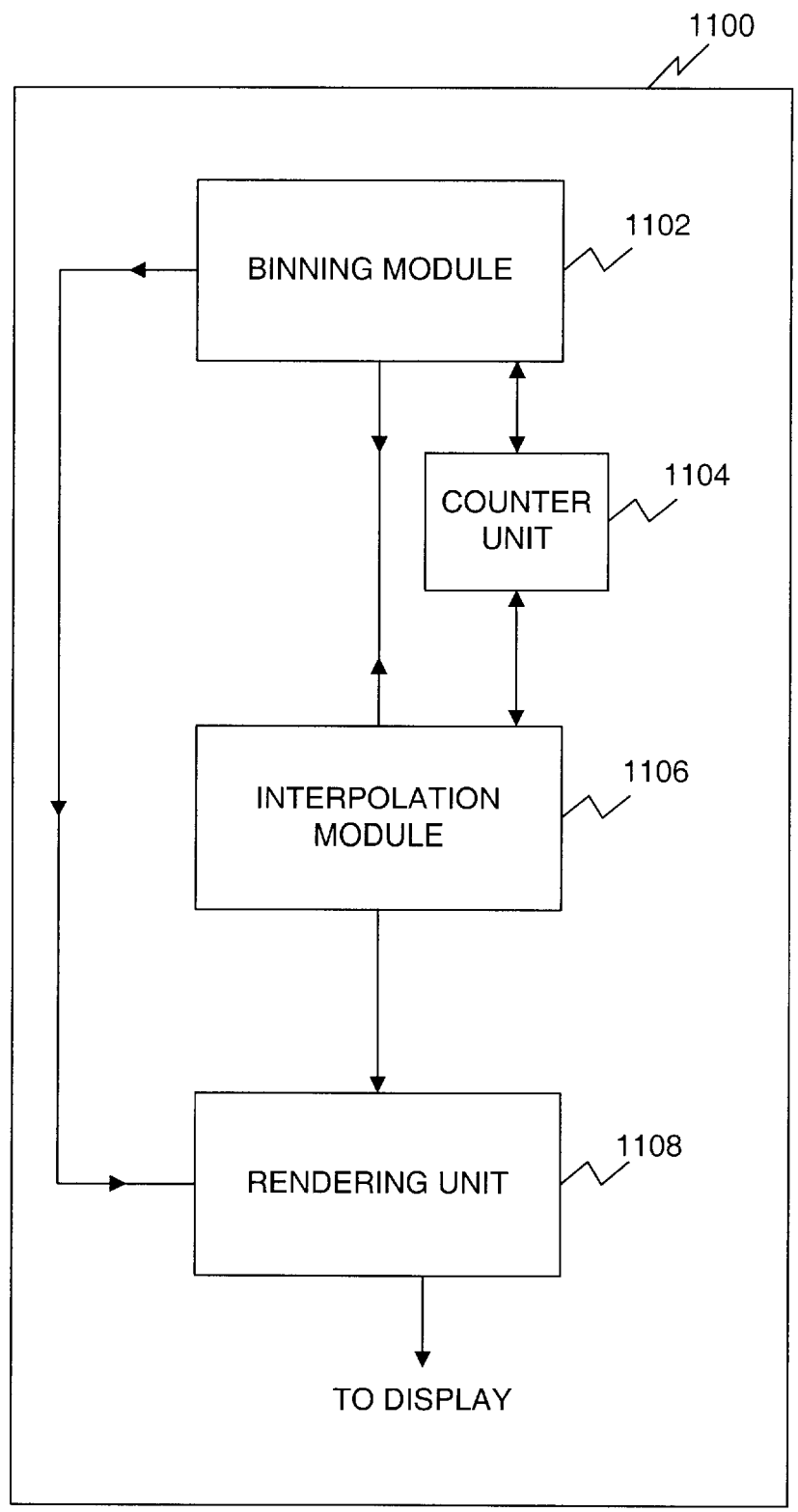
FIG. 11 is a block diagram of the computer graphics system components for executing the routine of FIGS. 9A and 9B.

The present invention may be implemented using hardware, software, firmware, or a combination thereof and may be implemented in a computer system or other processing system. In fact, in one embodiment, the invention is directed toward a computer system capable of carrying out the functionality described herein. For example, as shown in FIG. 11, a binning module 1102, as part of a computer graphics system 1100, can be used in binning the data points into bins in step and determine a bin position for each bin (as described in step 120 of FIG. 1). A counter unit 1104 can be used to determine a count of scatter data points in each bin (as described in step 130 of FIG. 1). An interpolation module 1106 can be used to interpolate scatter data points corresponding to a given position between discrete positions of an external query device (not shown). In addition, interpolation module 1106 can be designed to perform steps 910 through 940 of FIGS. 9A and 9B in order to generate interpolated bins. A rendering unit 1108 can be used for rendering a data visualization representative of the interpolated bins (as described in step 150 of FIG. 9).

6. Example GUI Computer Environment

Figure 5:
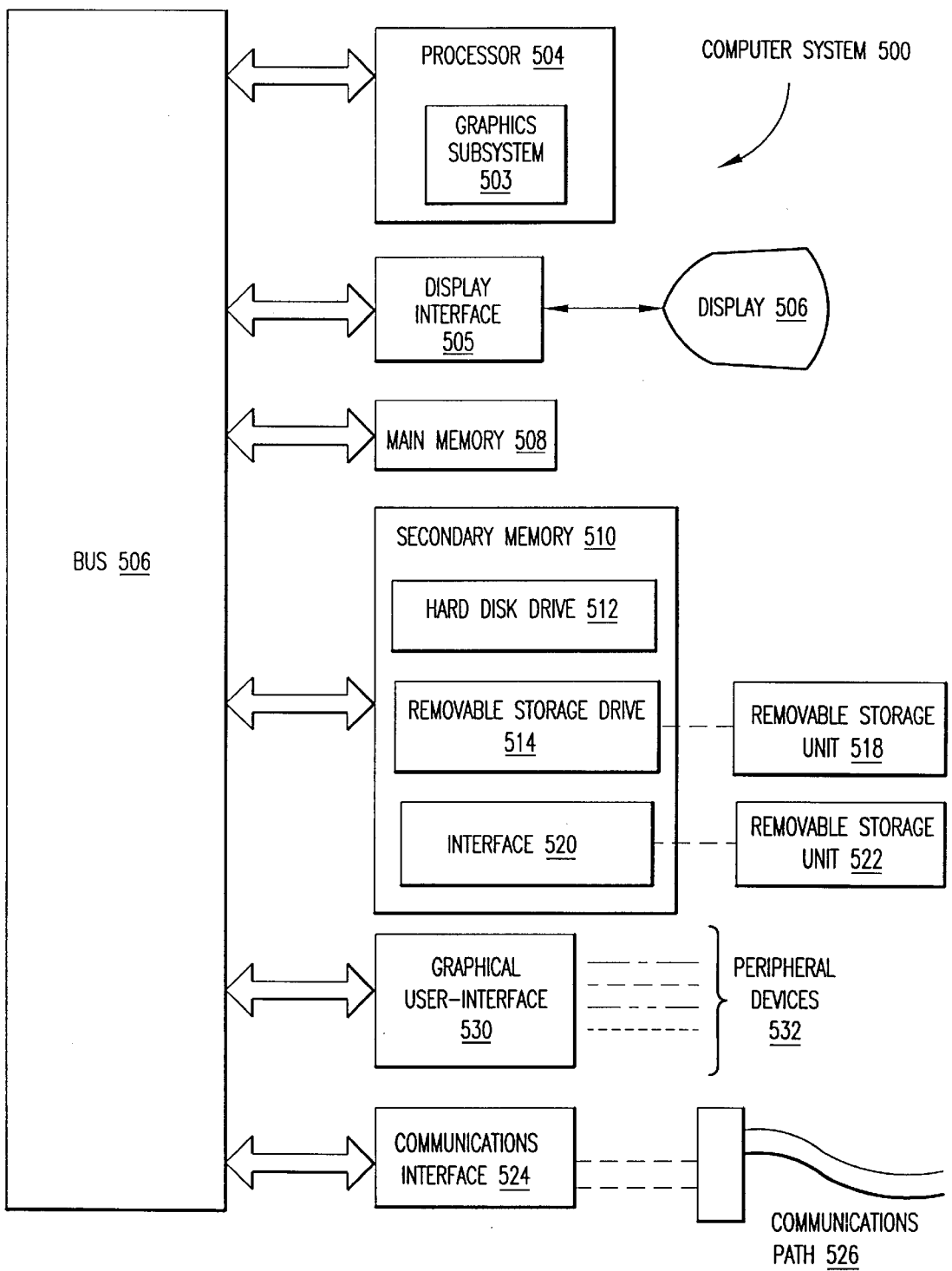
FIG. 5 shows an example computer graphics system for executing the routine of FIG. 1.

FIG. 5 is a block diagram illustrating an example environment in which the present invention can operate. The environment is a computer system 500 that includes one or more processors, such as processor 504. Computer system 500 can include any type of general computer.

The processor 504 is connected to a communications bus 506. Various software embodiments are described in terms of this example computer system. This description is illustrative and not intended to limit the present invention. After reading this description, it will be apparent to a person skilled in the relevant art how to implement the invention using other computer systems and/or computer architectures.

Computer system 500 includes a graphics subsystem 503. Graphics subsystem 503 can be implemented as one or more processor chips. The graphics subsystem 503 can be included as part of processor 504 as shown in FIG. 5 or as a separate graphics engine or processor. Graphics data is output from the graphics subsystem 503 to the bus 506. Display interface 505 forwards graphics data from the bus 506 for display on the display unit 506.

Computer system 500 also includes a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc., which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 524 can include a modem, a network interface (such as Ethernet card), a communications port, etc. software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

Graphical user interface module 530 transfers user inputs from peripheral devices 532 to bus 506. These peripheral devices 532 can be a mouse, keyboard, touch screen, microphone, joystick, stylus, light pen, or any other type of peripheral unit. These peripheral devices 532 enable a user to operate and control the data visualization tool of the present invention as described above.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 5. In this document, the term "computer pro(gram product" is used to generally refer to removable storage unit 518 or a hard disk installed in hard disk drive 512. These computer program products are means for providing software to computer system 500.

Computer programs (also called computer control logic) are stored in main memory and/or secondary memory 510. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. Alternatively, the computer program product may be downloaded to computer system 500 over communications path 526. The control logic (software), when executed by the processor 504, causes the processor 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

7. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for visually approximating a scatter plot of data points, comprising the steps of:

grouping the data points into spatial bins;

determining a position for each bin;

determining a count of data points in each bin;

for each bin, determining a distribution of a variable associated with the data points in a respective bin, wherein the variable has multiple categorical values; and rendering splats at bin positions of corresponding bins, wherein said rendering step renders at least one splat with multiple colors representative of the distribution determined for a corresponding bin.

2. The method of claim 1, wherein the variable is a categorical variable.

3. The method of claim 1, wherein said determining a distribution step comprises the steps of:

determining n number of values in the variable;

creating a vector having n number of locations;

associating each value with one of the vector locations;

calculating a weight for each value; and storing the calculated percentage of total bin weight for each value in its associated vector location.

4. The method of claim 3, wherein the weight is a percentage.

5. The method of claim 3, wherein the weight is a count.

6. The method of claim 1, further comprising the step of assigning a visually distinct color to each of the vector locations.

7. The method of claim 6, wherein said rendering step uses a splat, wherein the splat is divided into multiple regions and wherein said rendering step shades the multiple regions such that the shaded areas of the multiple regions has a distribution approximately the same as the distribution determined in said step of determining a distribution of a variable.

8. The method of claim 7, wherein the region takes the shape of a triangle, wherein each triangle covers the same area in the splat as all the other triangles.

9. The method of claim 7, wherein said rendering step renders each splat with multiple distinct colors that are a function of the weights stored in the vector locations.

10. The method of claim 9, wherein said rendering step, prior to rendering each splat with multiple distinct colors, sums all the weights in the vector locations below a threshold and assigns a new value to the weights, wherein the splat gets colored a neutral color that is a function of the summed weight.

11. The method of claim 10, further comprising the step of:

globally scaling the threshold of each splat.

12. A system for visually approximating a scatter plot of data points, comprising:

means for grouping the data points into spatial bins;

means for determininig a position for each bin;

means for determining a count of data points in each bin;

for each bin, means for determining a distribution of a variable associated with the data points in a respective bin, wherein the variable has multiple categorical values; and means for rendering splats at bin positions of corresponding bins, wherein said means for rendering renders at least one splat with multiple colors representative of the distribution determined for a corresponding bin.

13. The system of claim 12, wherein the variable is a categorical variable.

14. The system of claim 12, wherein said means for determining a distribution comprises:

means for determining n number of values in the variable;

means for creating a vector having n number of locations;

means for associating each value with one of the vector locations;

means for calculating a weight for each value; and means for storing the calculated percentage of total bin weight for each value in its associated vector location.

15. The system of claim 14, wherein the weight is a percentage.

16. The system of claim 14, wherein the weight is a count.

17. The system of claim 12, further comprising means for assigning a visually distinct color to each of the vector locations.

18. The system of claim 17, wherein said rendering means uses a splat, wherein the splat is divided into multiple regions and wherein said means for rendering shades the multiple regions such that the shaded areas of the multiple regions has a distribution approximately the same as the distribution determined by said means for determining a distribution of a variable.

19. The system of claim 18, wherein the region takes the shape of a triangle, wherein each triangle covers the same area in the splat as all the other triangles.

20. The system of claim 18, wherein said rendering means renders each splat with multiple distinct colors that are a function of the weights stored in the vector locations.

21. The system of claim 20, wherein said rendering means, prior to rendering each splat with multiple distinct colors, sums all the weights in the vector locations below a threshold and assigns a new value to the weights, wherein the splat gets colored a neutral color that is a function of the summed weight.

22. The system of claim 21, further comprising means for globally scaling the threshold of each splat.

23. A computer program product comprising a computer useable medium having computer program logic recorded thereon for enabling a graphics processor in a computer system to visually approximate a scatter plot of data points, the computer program logic comprising:

means for enabling the graphics processor to bin the data points into bins;

means for enabling the graphics processor to determine a bin position for each bin;

means for enabling the graphics processor to determine a count of data points in each bin;

for each bin, means for enabling the graphics processor to determine a distribution of a variable associated with the data points in a respective bin, wherein the variable has multiple values; and means for enabling the graphics processor to render splats at bin positions of corresponding bins, each splat having an opacity that is a function of the count of data points in a corresponding bin, whereby, a splat plot can be displayed that visually approximates the scatter plot of data points, and wherein said rendering step renders each splat with respective distinct colors that is a function of the distribution determined for a corresponding bin.

24. The computer program product of claim 23, wherein said means for enabling the graphics processor to determine a distribution of a variable comprises:

means for enabling the graphics processor to determine the n number of values in the variable;

means for enabling the graphics processor to create a vector having n number of locations;

means for enabling the graphics processor to associate each value with one of the vector locations;

means for enabling the graphics processor to calculate a weight for each value; and means for enabling the graphics processor to store the weight for each value in its associated vector location, wherein said means for enabling the graphics processor to render splats renders each splat with multiple distinct colors that are a function of the weights stored in the vector locations.

25. A method for visualizing information related to a large number of bins where distinct colors are mapped to represent different values of a categorical variable, comprising the steps of:

determining distribution weights that represent the different values of the categorical variable;

mapping a distinct color to each of the weights; and rendering splats for each bin, wherein said rendering step renders at least one splat with multiple colors representative of the distribution weights determined for the values of the categorical variable.

26. A system for visualizing information related to a large number of bins where distinct colors are mapped to represent different values of a categorical variable, comprising the steps of:

means for determining distribution weights that represent the different values of the categorical variable;

means for mapping a distinct color to each of the weights; and means for rendering splats for each bin, wherein said means for rendering renders at least one splat with multiple colors representative of the distribution weights determined for the values of the categorical variable.

27. A method of interpolating data for animating an external query attribute of a scatter plot of data points in a computer system capable of displaying a plurality of colors, comprising the steps of:

(1) determining adjacent data structures corresponding to a position of a first external querying device that queries the data attribute, wherein the adjacent data structures include a first data structure and a second data structure, and wherein the data structures comprise a plurality of processed bins of data points, wherein the first and second data structures each have a vector, wherein each vector has multiple locations storing values representing a distribution of a categorical variable;

(2) merging the first adjacent data structure vector with the second adjacent data structure vector, wherein the values in the same location in the vectors are merged together;

(3) aggregating the first adjacent data structure vector with the second adjacent data structure vector, wherein the values in the same location in the vectors are aggregated together using) a spatial column of the data structure as a unique key;

(4) interpolating the first adjacent data structure vector with the second adjacent data structure vector generating an interpolated vector, wherein the values in the same location in the vectors are interpolated together;

(5) mapping to color the interpolated vector, wherein values in the interpolated vector are weighted by count; and (6) rendering a data visualization representative of the interpolated vector.

28. A system of interpolating data for animating an external query attribute of a scatter plot of data points in a computer system capable of displaying a plurality of colors, comprising the steps of:

means for determining adjacent data structures corresponding to a position of a first external querying device that queries the data attribute, wherein the adjacent data structures include a first data structure and a second data structure, and wherein the data structures comprise a plurality of processed bins of data points, wherein the first and second data structures each have a vector, wherein each vector has multiple locations storing values representing a distribution of a categorical variable;

means for merging the first adjacent data structure vector with the second adjacent data structure vector, wherein the values in the same location in the vectors are merged together;

means for aggregating the first adjacent data structure vector with the second adjacent data structure vector, wherein the values in the same location in the vectors are aggregated together using a spatial column of the data structure as a unique key;

means for interpolating the first adjacent data structure vector with the second adjacent data structure vector generating an interpolated vector, wherein the values in the same location in the vectors are interpolated together;

means for mapping to color the interpolated vector, wherein values in the interpolated vector are weighted by count; and means for rendering a data visualization representative of the interpolated vector.

* * * * *

UNITED STATES PATENT AND TRADEMARK OFFICE
CERTIFICATE OF CORRECTION

PATENT NO. : 6,373,483 B1
DATED : April 16, 2002
INVENTOR(S) : Becker et al.

It is certified that error appears in the above-identified patent and that said Letters Patent is hereby corrected as shown below:

Title page,
Item [56], References Cited, OTHER PUBLICATIONS, please insert the following citations:
-- "A Dozen Companies on the Rise," *http://www.dbpd.com/seconddz.htm*, pp. 1-9, (Miller Freeman Inc. 1997).
"A Map for All Reasons", advertisement, Strategic Mapping, Inc., San Jose, CA 95117 (page and date unknown).
Aha, D.W. *et al.*, "Instance-Based Learning Algorithms," *Machine Learning*, Vol. 6, No. 1, pp. 37-66 (Jan. 1991).
Ahlberg *et al.*, "IVEE: An Information Visualization & Exploration Environment," Proceedings of Information Visualization '95, 1995, pp. 66-73.
Alexander, M., "Visualizing Cleared-Off Desktops", *Computerworld 25 (18)*, May 6, 1991, p. 20.
Alexander, Michael, "GIS Sprouting Corporate Wings", *Computerworld*, July 22, 1991, pg. 20. --

U.S. PATENT DOCUMENTS, please delete the citation for U.S. Patent No. "5,864,891"

Column 30,
Line 20, after "using", please delete ")".

Signed and Sealed this

Twenty-third Day of December, 2003

JAMES E. ROGAN
*Director of the United States Patent and Trademark Office*